(12) United States Patent
Rybicki

(10) Patent No.: US 7,007,003 B1
(45) Date of Patent: Feb. 28, 2006

(54) NOTIFICATION PROTOCOL FOR ESTABLISHING SYNCHRONIZATION MODE FOR USE IN SYNCHRONIZING DATABASES

(75) Inventor: Stephen G. Rybicki, Campbell, CA (US)

(73) Assignee: Intellisync Corporation, San Jose, CA (US)

(*) Notice: Subject to any disclaimer, the term of this patent is extended or adjusted under 35 U.S.C. 154(b) by 0 days.

(21) Appl. No.: 09/205,020

(22) Filed: Dec. 4, 1998

(51) Int. Cl.
*G06F 17/30* (2006.01)

(52) U.S. Cl. .......................................... 707/1; 709/200

(58) Field of Classification Search ................. 707/101, 707/7, 102, 103, 104, 8–10; 709/200–207, 709/238–244, 400
See application file for complete search history.

(56) References Cited

U.S. PATENT DOCUMENTS

| | | | |
|---|---|---|---|
| 4,162,610 A | 7/1979 | Levine | |
| 4,432,057 A | 2/1984 | Daniell et al. | 364/300 |
| 4,807,154 A | 2/1989 | Scully et al. | |
| 4,807,155 A | 2/1989 | Cree et al. | |
| 4,807,182 A | 2/1989 | Queen | 364/900 |
| 4,817,018 A | 3/1989 | Cree et al. | |
| 4,819,156 A | 4/1989 | DeLorme et al. | 364/200 |
| 4,819,191 A | 4/1989 | Scully et al. | |
| 4,827,423 A | 5/1989 | Beasley et al. | 364/468 |
| 4,831,552 A | 5/1989 | Scully et al. | |
| 4,866,611 A | 9/1989 | Cree et al. | 364/300 |
| 4,875,159 A | 10/1989 | Cary et al. | 364/200 |
| 4,939,689 A | 7/1990 | Davis et al. | |
| 4,956,809 A | 9/1990 | George et al. | 364/900 |

(Continued)

OTHER PUBLICATIONS

Adly, "HARP: A Hierarchical Asynchronous Replication Protocol for Massively Replicated Systems," Computer Laboratory, Cambridge University, United Kingdom (undated).
Adly et al., "A Hierarchical Asynchronous Replication Protocol for Large Scale Systems," Computer Laboratory, Cambridge University, United Kingdom, Computer Science Department, Alexandria University, Egypt (undated).
Alexander, "Designed, sold, delivered, serviced," Computerworld Client/Server Journal, pp. 43 (Oct. 1, 1995).
"All I need is a miracle; computer-aided educational packages; Small Wonders," Coastal Associates Publishing L.P. (Mar. 1992).
Alonso et al., "Database System Issues in Nomadic Computing," Matsushita Information Technology Laboratory, New Jersey (undated).
Badrinath et al., "Impact of Mobility on Distributed Computations," Operating Systems Review (Apr. 1, 1993).
Barbara et al., "Sleeper and Workaholics: Caching Strategies in Mobile Environments (Extended Version)" Aug. 29, 1994.

(Continued)

*Primary Examiner*—James P. Trammell
*Assistant Examiner*—Mary Cheung
(74) *Attorney, Agent, or Firm*—Fish & Richardson P.C.

(57) ABSTRACT

A method for reducing message traffic during synchronization between a database residing on a first computer (e.g., a remote computer) and another database residing on a second computer (e.g., a central computer) is disclosed. The first computer transmits to the second computer a proposed synchronization mode and at least one operation that operates on a record stored in the other database. The operation is transmitted to the second computer before the second computer returns to the first computer a confirmation message accepting the proposed synchronization mode. Synchronization is essentially independent of latency in the communication channel.

19 Claims, 10 Drawing Sheets

U.S. PATENT DOCUMENTS

| | | | |
|---|---|---|---|
| 4,980,844 A | 12/1990 | Demjanenko et al. | 364/550 |
| 5,065,360 A | 11/1991 | Kelly | 395/800 |
| 5,124,912 A | 6/1992 | Hotaling et al. | |
| 5,134,564 A | 7/1992 | Dunn et al. | |
| 5,136,707 A | 8/1992 | Block et al. | 395/600 |
| 5,142,619 A | 8/1992 | Webster, III | 395/157 |
| 5,155,850 A | 10/1992 | Janis et al. | 395/600 |
| 5,170,480 A | 12/1992 | Mohan et al. | 395/600 |
| 5,187,787 A | 2/1993 | Skeen et al. | 395/600 |
| 5,197,000 A | 3/1993 | Vincent | |
| 5,201,010 A | 4/1993 | Deaton et al. | |
| 5,210,868 A | 5/1993 | Shimada et al. | 395/600 |
| 5,220,540 A | 6/1993 | Nishida et al. | |
| 5,228,116 A | 7/1993 | Harris et al. | 395/54 |
| 5,237,678 A | 8/1993 | Kuechler et al. | 395/600 |
| 5,251,151 A | 10/1993 | Demjanemko et al. | 364/550 |
| 5,251,291 A | 10/1993 | Malcolm | 395/146 |
| 5,261,045 A | 11/1993 | Scully et al. | 395/161 |
| 5,261,094 A | 11/1993 | Everson et al. | 395/600 |
| 5,272,628 A | 12/1993 | Koss | 364/419.19 |
| 5,276,876 A | 1/1994 | Coleman et al. | |
| 5,278,978 A | 1/1994 | Demers et al. | 395/600 |
| 5,278,982 A | 1/1994 | Daniels et al. | 395/600 |
| 5,283,887 A | 2/1994 | Zachery | 395/500 |
| 5,293,627 A | 3/1994 | Kato et al. | 395/550 |
| 5,301,313 A | 4/1994 | Terada et al. | 395/600 |
| 5,315,709 A | 5/1994 | Alston, Jr. et al. | 395/600 |
| 5,323,314 A | 6/1994 | Baber et al. | |
| 5,327,555 A | 7/1994 | Anderson | 395/600 |
| 5,333,252 A | 7/1994 | Brewer, III et al. | 395/148 |
| 5,333,265 A | 7/1994 | Orimo et al. | 395/200 |
| 5,333,316 A | 7/1994 | Champagne et al. | 395/600 |
| 5,339,392 A | 8/1994 | Risberg et al. | 395/161 |
| 5,339,434 A | 8/1994 | Rusis | 395/700 |
| 5,355,476 A | 10/1994 | Fukumura | 395/600 |
| 5,375,234 A | 12/1994 | Davidson et al. | 395/600 |
| 5,392,390 A | 2/1995 | Crozier | 395/161 |
| 5,396,612 A | 3/1995 | Huh et al. | 395/575 |
| 5,412,801 A | 5/1995 | de Remer et al. | |
| 5,421,012 A | 5/1995 | Khoyi et al. | |
| 5,434,994 A | 7/1995 | Shaheen et al. | 395/500 |
| 5,444,851 A | 8/1995 | Woest | 395/200.1 |
| 5,455,945 A | 10/1995 | VanderDrift | |
| 5,463,735 A | 10/1995 | Pascucci et al. | 395/200.1 |
| 5,475,833 A | 12/1995 | Dauerer et al. | 395/600 |
| 5,511,188 A | 4/1996 | Pascucci et al. | 395/600 |
| 5,519,606 A | 5/1996 | Frid-Nielsen et al. | 364/401 |
| 5,530,853 A | 6/1996 | Schell et al. | |
| 5,530,939 A | 6/1996 | Mansfield, Jr et al. | |
| 5,557,518 A | 9/1996 | Rosen | |
| 5,560,005 A | 9/1996 | Hoover et al. | |
| 5,568,402 A | 10/1996 | Gray et al. | 364/514 C |
| 5,581,753 A | 12/1996 | Terry et al. | |
| 5,581,754 A | 12/1996 | Terry et al. | |
| 5,583,793 A | 12/1996 | Gray et al. | 364/514 C |
| 5,596,574 A | 1/1997 | Perlman et al. | 370/389 |
| 5,600,834 A | 2/1997 | Howard | 395/617 |
| 5,608,865 A | 3/1997 | Midgely et al. | |
| 5,613,113 A | 3/1997 | Goldring | 395/618 |
| 5,615,109 A | 3/1997 | Eder | |
| 5,615,364 A | 3/1997 | Marks | |
| 5,619,689 A | 4/1997 | Kelly | |
| 5,623,540 A | 4/1997 | Morrison et al. | |
| 5,630,081 A | 5/1997 | Rybicki et al. | 395/348 |
| 5,649,182 A | 7/1997 | Reitz | |
| 5,649,195 A * | 7/1997 | Scott et al. | 395/617 |
| 5,659,741 A | 8/1997 | Eberhardt | |
| 5,666,530 A | 9/1997 | Clark et al. | 395/617 |
| 5,666,553 A | 9/1997 | Crozier | 395/803 |
| 5,671,407 A | 9/1997 | Demers et al. | |
| 5,682,524 A | 10/1997 | Freund et al. | 395/605 |
| 5,684,984 A | 11/1997 | Jones et al. | 395/610 |
| 5,684,990 A | 11/1997 | Boothby | 395/619 |
| 5,689,706 A | 11/1997 | Rao et al. | 395/617 |
| 5,701,423 A | 12/1997 | Crozier | 395/335 |
| 5,704,029 A | 12/1997 | Wright, Jr. | |
| 5,706,429 A * | 1/1998 | Lai et al. | 395/200.01 |
| 5,706,452 A | 1/1998 | Ivanov | |
| 5,706,509 A | 1/1998 | Man-Hak Tso | |
| 5,708,812 A | 1/1998 | Van Dyke et al. | 395/712 |
| 5,708,840 A | 1/1998 | Kikinis et al. | 395/800 |
| 5,710,922 A | 1/1998 | Alley et al. | 395/617 |
| 5,727,202 A | 3/1998 | Kucala | 395/610 |
| 5,729,735 A | 3/1998 | Meyering | 395/610 |
| 5,737,539 A | 4/1998 | Edelson et al. | |
| 5,740,433 A * | 4/1998 | Carr et al. | 395/618 |
| 5,745,712 A | 4/1998 | Turpin et al. | 395/333 |
| 5,758,083 A | 5/1998 | Singh et al. | |
| 5,758,150 A * | 5/1998 | Bell et al. | 395/610 |
| 5,758,337 A | 5/1998 | Hammond | 707/6 |
| 5,758,355 A | 5/1998 | Buchanan | 707/201 |
| 5,778,388 A | 7/1998 | Kawamura et al. | 707/203 |
| 5,781,908 A | 7/1998 | Williams et al. | 707/104 |
| 5,790,789 A | 8/1998 | Suarez | |
| 5,794,252 A * | 8/1998 | Bailey et al. | 707/202 |
| 5,809,494 A | 9/1998 | Nguyen | |
| 5,813,009 A | 9/1998 | Johnson et al. | |
| 5,813,013 A | 9/1998 | Shakib et al. | 707/102 |
| 5,819,272 A | 10/1998 | Benson | |
| 5,819,274 A | 10/1998 | Jackson, Jr. | |
| 5,832,218 A | 11/1998 | Gibbs et al. | |
| 5,832,489 A | 11/1998 | Kucala | 707/10 |
| 5,835,908 A * | 11/1998 | Bennett et al. | 707/10 |
| 5,838,923 A | 11/1998 | Lee et al. | 395/200.66 |
| 5,845,293 A | 12/1998 | Veghte et al. | 707/202 |
| 5,857,201 A | 1/1999 | Wright, Jr. et al. | 707/104 |
| 5,870,759 A | 2/1999 | Bauer et al. | 707/201 |
| 5,870,765 A | 2/1999 | Bauer et al. | 707/203 |
| 5,875,242 A | 2/1999 | Glaser et al. | |
| 5,877,760 A | 3/1999 | Onda et al. | |
| 5,878,415 A | 3/1999 | Olds | |
| 5,884,323 A | 3/1999 | Hawkins et al. | 707/201 |
| 5,884,324 A | 3/1999 | Cheng et al. | 707/201 |
| 5,884,325 A | 3/1999 | Bauer et al. | 707/201 |
| 5,892,909 A | 4/1999 | Grasso et al. | |
| 5,892,949 A * | 4/1999 | Noble | 395/704 |
| 5,897,640 A | 4/1999 | Veghte et al. | 707/202 |
| 5,924,094 A | 7/1999 | Sutter | |
| 5,926,816 A | 7/1999 | Bauer et al. | 707/8 |
| 5,926,824 A | 7/1999 | Hashimoto | 707/520 |
| 5,928,329 A | 7/1999 | Clark et al. | 709/227 |
| 5,943,676 A | 8/1999 | Boothby | 707/201 |
| 5,956,508 A | 9/1999 | Johnson et al. | |
| 5,966,714 A | 10/1999 | Huang et al. | |
| 5,974,238 A | 10/1999 | Chase, Jr. | |
| 5,978,813 A | 11/1999 | Foltz et al. | 707/201 |
| 5,995,980 A | 11/1999 | Olson et al. | |
| 5,999,947 A * | 12/1999 | Zollinger et al. | 707/203 |
| 6,018,303 A | 1/2000 | Sadeh | |
| 6,044,381 A | 3/2000 | Boothby et al. | 707/201 |
| 6,081,806 A * | 6/2000 | Chang et al. | 707/8 |
| 6,098,078 A | 8/2000 | Gehani et al. | |
| 6,125,369 A | 9/2000 | Wu et al. | 707/201 |
| 6,141,664 A | 10/2000 | Boothby | 707/201 |
| 6,212,221 B1 | 4/2001 | Wakayama et al. | |
| 6,233,452 B1 | 5/2001 | Nishino | |
| 6,247,135 B1 | 6/2001 | Feague | 713/400 |
| 6,272,074 B1 | 8/2001 | Winner | |
| 6,324,542 B1 | 11/2001 | Wright, Jr. et al. | |
| 6,330,568 B1 | 12/2001 | Boothby | |
| 6,405,218 B1 | 6/2002 | Boothby | |

OTHER PUBLICATIONS

Bowen, M. et al., Achieving Throughput and Functionality in a Common Architecture: The Datacycle Experiment, *IEEE*, pp. 178, 1991.

Brandel, "New offerings fuel revival of PIM," Computerworld, p. 39 (Sep. 12, 1994).

Brodersen, "InfoPad–An Experiment in System Level Design and Integration," (Mar. 1, 1997).

Demers et al., "The Bayou Architecture: Support for Data Sharing Among Mobile Users," Computer Science Laboratory, Xerox Palo Alto Research Center, California (undated).

DeVoe et al., "SOFTWARE: Day–Timer Organizer 2.0 based on format of paper–based PIM," InfoWorld, vol. 17 (Aug. 21, 1995).

Froese, "File System Support for Weakly Connected Operation," pp. 229–238 (undated).

Greenberg et al., "Real Time Groupware as a Distributed System: Concurrency Control and its Effect on the Interface," Procs. Of the ACM CSCW Conf. On Computer Supported Cooperative Work, Oct. 22–26, North Carolina, ACM Press (Jan. 1, 1994).

Guy, "Ficus: A Very Large Scale Reliable Distributed File System," Technical Report CSD–910018, Computer Science Dept. UCLA (Technical Report) (Jun. 3, 1991).

Guy et al., "Implementation of the Ficus Replicated File System," appeared in Procs. Of the Summer USENIX Conf., Anaheim, CA, pp. 63–71 (Jun. 1, 1990).

Haber, "Renegade PIMS," Computerworld, p. 109 (Dec. 12, 1994).

Hammer et al., "An Approach to Resolving Semantic Heterogeneity in a Federation of Autonomous, Heterogeneous Database Systems," Computer Science Department, University of Southern California (undated).

Hammer et al., "Object Discovery and Unification in Federated Database Systems," University of Southern California (undated).

HP and IntelliLink connect HP 95LX with HP NewWave; IntelliLink for the HP NewWare; product announcement, HP Professional (Aug. 1991).

"HP announces expanded memory version of palmtop PC, introduces I–Megabyte HP 95LX and 1–Megabyte memory cards," Business Wire, Inc. (Mar. 4, 1992).

Huston et al., "Disconnected Operations of AFS," CITI Technical Report 93–3, Center for Information Technology Integration, University of Michigan (Jun. 18, 1993).

IBM Dictionary of Computing, Tenth Edition, 1993, pp. 268, 269, 31_.

IBM Dictionary of Computing, Tenth Edition, 1993, pp. 165, 268, 349, 370, 417.

IEEE Standard Dictionary of Electrical and Electronics Terms, Fourth Edition, 1988, p. 372, 368, 509, 563.

Imielinski, "Mobile Computing—DataMan Project Perspective," Rutgers University (undated).

"IntelliLink 2.2: the software connection from desktop to palmtop; Software Review; IntelliLink 2.2; Evaluation," PC Magazine (Apr. 28, 1992).

"IntelliLink transfers palmtop, PC data; communications software from IntelliLink Inc; brief article; Product Announcement," PC Week (Nov. 18, 1991).

Jacobs et al., "A Generalized Query–by–Example Data Manipulation Language Based on Database Logic," IEEE Transactions on Software Engineering, vol. SE–9, No. 1 (Jan. 1983).

Jenkins, "Users struggle with E–mail Woes," Computer-World, p. 97 (Oct. 24, 1994).

Johnson et al., "Hierarchical Matrix Timestamps for Scalable Update Propogation," submitted to the $10^{th}$ Int. Workshop on Distributed Algorithms (Jun. 25, 1996).

Joshi et al., "A Survey of Mobile Computing Technologies and Applications," (Oct. 29, 1995).

Kistler et al., "Disconnected Operation on the Coda File System," School of Computer Science, Carnegie Melon University, Pennsylvania (undated).

Krill, "NETWORKING: Tech Update," InfoWorld, vol. 18 (Feb. 12, 1996).

Kumar et al., "Log–Based Directory Resolution in the Coda File System," School of Computer Science, Carnegie Melon University, Pennsylvania (undated).

Larson et al., "A Theory of Attribute Equivalence in Databases with Application to Schema Integration," IEEE Transactions on Software Engineerring, vol. 15, No. 4, Apr. 1989.

Mannino et al., "Matching Techniques in Global Schema Design," IEEE 1984.

Marshall, "Product Reviews: Windows contact managers," InfoWorld, vol. 18 (Mar. 25, 1996).

McGoveran, "Distributed not yet delivered," Computerworld, p. 112 (Jun. 6, 1994).

Meckler Corporation, "Palmtop–to–desktop linkage software," Database Searcher (Jun. 1992).

Microsoft Press Computer Dictionary, Second Edition, 1994, p. 164.

Microsoft Press Computer Dictionary, Second Edition, 1994, pp. 105, 217, 227, 228.

Microsoft Press Computer Dictionary, Third Edition, 1997, pp. 194, 228, 234, 449.

Milliken, "Resource Coordination Objects: A State Distribution Mechanism," (DRAFT) (Dec. 10, 1993).

Nash, "Replication falls short," Computer world, p. 65 (Nov. 21, 1994).

Noble et al., "A Research Status Report for Adaptation for Mobile Data Access," School of Computer Science, Carnegie Melon University (undated).

"PackRat PIM gets older and wiser with Release 4.0; PIM update sports enhanced interface, greater ease of use," InfoWorld (Dec. 23, 1991).

"Palmtop PCs: power by the ounce; Hardware Review; overview of six evaluations of palm–top computers; includes related articles on Editor's Choices, suitability–to–task ratings, impressions by individual users; evaluation," PC Magazine (Jul. 1991).

"Pen–based PCs ready for prime time; includes related article on comparison of operating systems, list of vendors of pen–based products," PC–Computing (Nov. 1991).

Perera, "Synchronization Schizophrenia," ComputerWorld Client/Server Journal, p. 50 (Oct. 1, 1995).

Petersen et al., "Bayou: Replicated Database Services for World–wide Applications," Computer Science Laboratory, Xerox Palo Alto Research Center, California (undated).

"Product comparisons: Atari Portfolio, Casio Executive BOSS, HP 95LX, Poqet PC, Psion series 3, Sharp Wizard," InfoWorld (Dec. 16, 1991).

"Product Comparison: Personal information managers," InfoWorld, vol. 17 (Aug. 7, 1995).

Qu et al., Technical Report entitled "Mobile File Filtering," TR–CS–97–02–Australian National University (Feb. 1, 1997).

Radosevich, "Replication mania," Computerworld Client/Server Journal, p. 53 (Oct. 1, 1995).

Ratner et al., "The Ward Model: A Replication Architecture for Mobile Environments," Department of Computer Science, University of California (undated).

Reiher et al., "Peer–to–Peer Reconciliation Based Replication for Mobile Computers," UCLA (undated).

Reiher et al., "Resolving File Conflicts in the Ficus File System," Department of Computer Science, University of California (undated).

Ricciuti, "Object database server," InfoWorld, vol. 18 (Jan. 29, 1996).

"Riding the NewWave from PC to Palmtop: IntelliLink lets NewWave users transfer files," InfoWorld (Jun. 3, 1991).

Saltor et al., "Suitability of data models as canonical models for federated databases," Universitat Politecnica de Catalunya, Spain (undated).

Satyanarayanan, "Coda: A Highly Available File System for a Distributed Workstation Environment," School of Computer Science, Carnegie Mellon University (undated).

Satyanarayanan, "Fundamental Challenges in Mobile Computing," School of Computer Science, Carnegie Mellon University (undated).

Satyanarayanan, "Mobile Information Access," IEEE Personal Communications, vol. 3, No. 1 (Feb. 1996).

Sherman, "Information Technology: 'What Software Should I Use to Organize My Life'," (undated).

Sheth et al., "A Tool for Integrating Conceptual Schemas and User Views," IEEE 1988.

Schilit et al., "The ParcTab Mobile Computing System," Xerox Palo Alto Research Center, California (undated).

SPI Database Software Technologies Record Displays: Record 2, Serial No. TDB0291.0094 and Record 4, Serial No. iets0901.0073 (undated).

Staten, "PowerMerge 2.0 ships; syncs moved filed," MacWEEK, vol. 8, p. 38(1) (Jan. 3, 1994).

Tait, Doctoral Thesis entitled "A File System for Mobile Computing," (Jan. 1, 1993).

Tolly, "Enhanced Notes 4.0 gets thumbs–up," Computerworld, p. 54 (Dec. 18, 1995).

Webster's Ninth New Collegiate Dictionary, 1986, pp. 114, 436, 440, 462, 573, 597, 620, 717, 906, 963, 979, 989, 1000, 1053, 1130, 1142, 1152, 1162, 1166.

Wiederhold, Gio, Database Design, Second Edition, McGraw–Hill Book Company, 1983, p. 2.

Wiederhold, Gio and Qian Xiaolei, Consistency Control of Replicated Data In Federal Database, *IEEE*, pp. 130–132. 1990.

Zaino, "Tapping the Top Values in PDAs—Personal digital assistants that sell for as little as $300 can put a PC in the palm of your hand. Get the scoop on 8 contenders," HomePC, pp. 97 (Oct. 1, 1996).

Zisman et al., "Towards Inoperability in Heterogeneous Database Systems," Imperial College Research Report No. DOC 95/11 (Dec. 1, 1995).

IntelliLink for Windows User's Guide, Version 3.0, IntelliLink Corporation (1993).

Database Subsetting Tool: Introduction to DST and DST Designer's Guide, Syware, Inc. (1993).

Sarin, "Robust Application Design in Highly Available Distributed Databases," Proc. 5$^{th}$ Symp. Reliability in Distributed Software and Database Systems, pp. 87–94 (Jan. 13–15, 1986, Los Angeles).

Distributed Management of Replicated Data: Final Report, Computer Corporation of America (Oct. 9, 1984).

Sarin et al., "Overview of SHARD: A System for Highly Available Replicated Data", Computer Corporation of America (Apr. 8, 1988).

SRI Int'l, Network Reconstitution Protocol, RADC–TR–87–38, Final Technical Report (Jun. 1987).

Danberg, "A Database Subsetting Tool" (patent application) (Apr. 12, 1993).

Lamb et al., "The Objectstore Database System," Communications of the ACM, vol. 34, No. 10, pp. 50–63 (Oct. 1991).

TT Interchange, Time Technology, AVG Sales & Marketing Ltd. (1995).

Goldberg et al., "Using Collaborative Filtering to Weave an Information Tapestry," Communications of the ACM, vol. 35, No. 12, pp. 61–70 (Dec. 1992).

Now Up–to–Date Version 2.0 User's Guide, Now Software, Inc. (1992).

An Introduction to DataPropagator Relational Version 1, IBM Corporation (1993).

Data Propagator Relational Guide Release 1, IBM Corporation (May 1994).

DataPropagator Relational Guide Release 2, IBM Corporation (Dec. 1994).

DataPropagator NonRelational MVS/ESA Version 2 Utilities Guide, IBM Corporation (Jul. 1994).

DPROPR Planning and Design Guide, IBM Corporation (Nov. 1996).

DataPropagator Relational Capture and Apply/400 Version 3, IBM Corporation (Jun. 1996).

DataPropagator Relational Capture and Apply for OS/400 Version 3, IBM Corporation (Nov. 1996).

Newton Connection Utilities User's Manual for the Macintosh Operating System, Apple Computer, Inc. (1996).

Newton Connection Utilities User's Manual for Windows, Apple Computer, Inc.

Newton Connection Utilities User's Manual for Macintosh, Apple Computer, Inc.

Newton Backup Utility User's Guide for the Windows Operating System, Apple Computer, Inc. (1995).

Newton Backup Utility User's Guide for the Macintosh Operating System, Apple Computer, Inc. (1995).

Newton Utilities User Manual, Apple Computer, Inc. (1995).

FileMaker Pro Server Administrator's Guide, Claris Corporation (1994).

Connectivity Pack User's Guide for the HP 200LX and the HP 100LX, Hewlett Packard.

Lotus cc:Mail Release 2, Lotus Development Corporation (1991–1993).

User's Guide Lotus Organizer Release 1.0, Lotus Development Corporation (1992).

FileMaker Pro User's Guide, Claris Corporation (1990, 1992).

Poesio et al., "Metric Constraints for Maintaining Appointments: Dates and Repeated Activities".

Slater, "Newton's Legacy; 3COM and Microsoft Battle for Market Share; Apple Newton, 2Com Palm III, Microsoft Palm–size PC peronal digital assistants; Product Information", Information Access Company (1998).

Negrino, "ACT 2.5.1, ACT for Newton 1.0", UMI, Inc. (1996).

Zilber, "Toy story; personal digital assistants; Product Information", Information Access Company (1996).

Wingfield, "Desktop to Newton connectivity", UMI, Inc. (1996).

"Now Software Announces Updated Synchronization Software for Newton 2.0 Devices; Now Synchronize Simultaneously Updates MessagePad, Now Up–to–Date & Contact", Business Wire, Inc. (1995).

"Claris Ships FileMaker Pro 3.0 for Macintosh and Windows", Business Wire, Inc. (1995).

Alsop, "Distributed Thinking; Realizing the gravity of its PDA problems, Apple has drawn me back to Newton", InfoWorld Media Group (1995).

Rubin, "Now Software stays in sync; Now Synchronize file synchronization software for Mac and Newton PDAs; Software Review; EvaluationBrief Article", Information Access Company (1995).

"Now Calendar/Scheduler/Contact Mgr for Mac Update", Post–Newsweek Business Information Inc. (1995).

Staten, "csInStep middleware lets Newton talk to PIMs; Concierge Software LC's csInStep; Brief Article; Product Announcement; Brief Article", Information Access Company (1995).

Baum, "Designing Moble applications; A new approach needed for on–the–road systems", InfoWorld Media Group (1994).

Parkinson, "Remote users get in sync with office files; News Analysis", Information Access Company (1994).

Chapura, Inc., PocketMirror Features Page, http://www.chapura.com/features.html (1997).

Chapura, Inc., PocketMirror Support Page, http://www.chapura.com/support.html (1997).

"Open Network Computing—Technical Overview," Sun Technical Report, Microsystems, Inc., pp. 1–32 (1987).

"FRx Extends Reporting Power of Platinum Series: (IBM Desktop Software's Line of Accounting Software)," Doug Dayton, PC Week, v. 8, n. 5, p. 29(2) (Feb. 4, 1991).

IntelliLink brochure (1990).

"Logical Connectivity: Applications, Requirements, Architecture, and Research Agenda," Stuart Madnick &.

Zahn et al., Network Computing Architecture, pp. 1–11; 19–31; 87–115; 117–133; 189–199; 201–209 (1990).

Cobb et al., "Paradox 3.5 Handbook 3rd Edition," Bantam, pp. 803–816 (1991).

User Manual for PC–Link for the B.O.S.S. and the PC–Link for the B.O.S.S. Traveling Software, Inc. (19890.

User Manual for the Connectivity Pack for the HP 95LX, Hewlett Packard Company (1991).

Organizer Link II Operation Manual, Sharp Electronics Corporation.

Alfieri, "The Best of WordPerfect Version 5.0," Hayden Books, pp. 153–165, 429–435 (1988).

"Automatically Synchronized Objects," Research Disclosure #29261, p. 614 (Aug. 1988).

"The Big Picture (Accessing Information on Remote Data Management System," UNIX Review, v. 7, n. 8, p. 38(7) (Aug. 1989).

U.S. Appl. No. 08/749,926, filed Nov. 13, 1996.
U.S. Appl. No. 08/748,645, filed Nov. 13, 1996.
U.S. Appl. No. 08/927,922, filed Sep. 11, 1997.
U.S. Appl. No. 08/964,751, filed Nov. 5, 1997.
U.S. Appl. No. 09/169,199, filed Oct. 9, 1998.
U.S. Appl. No. 09/052,769, filed Mar. 31, 1998.
U.S. Appl. No. 09/036,400, filed Mar. 5, 1998.

Informix Guide to SQL Tutorial Version 7.1, Dec. 1994.

Lomet, D., Using timestamping to optimize two phase commit; Parallel and Distributed Information Systems, 1993, Proceeding of the Second International Conference, Jan. 20–22, 1993: pp. 48–55.

Oracle 7 Distributed Database Technology and Symmetric Replication, Oracle White Paper, Apr. 1995.

Oracle 7 Server Distributed Systems, vol. II: Replicated Data, Release 7.3, Feb. 1996.

Oracle 7™ Server SQL Manual Release 7.3, Feb. 1996.

Quaglia, F. et al., Grain Sensitive Event Scheduling in Time Warp Parallel Discrete Event Simulation, Fourteenth Workshop on Parallel Distributed Simulation, PADS 2000, May 28–31, 2000: pp. 173–180.

Salzberg, B., Timestamping After Commit, Procs. Of the Third Int. Conf. On Parallel and Distributed Information Systems, Sep. 28–30, 1994: pp. 160–167.

Zhang et al., Impact of Workload and System Parameters on Next Generation Cluster Scheduling Mechanisms, IEEE Trans. On Parallel and Distributed Systems, vol. 12, No. 9, Sep. 2001: pp. 967–985.

* cited by examiner

| Message Element | Bytes | Sample Data |
|---|---|---|
| Add opcode | 1 | 0x81 |
| Add data length | 2 | 51 |
| Add temp-record-id | 4 | 0x0F00D010 |
| Add field-count | 1 | 3 |
| Add Field 1 field-id | 1 | 100 |
| Add Field 1 field-length | 2 | 10 |
| Add Field 1 field-value | 10 | "John Smith" |
| Add Field 2 field-id | 1 | 101 |
| Add Field 2 field-length | 2 | 12 |
| Add Field 2 field-value | 12 | "408-123-4567" |
| Add Field 3 field-id | 1 | 102 |
| Add Field 3 field-length | 2 | 15 |
| Add Field 3 field-value | 15 | "19961201T083000" |
| Delete opcode | 1 | 0x03 |
| Delete data length | 2 | 5 |
| Delete unique-id id-length | 1 | 0x04 |
| Delete unique-id id-data | 4 | 0x00010224 |

FIG. 6

| Message Element | Bytes | Connected Synchronization Sample Data | Connectionless Synchronization Sample Data |
|---|---|---|---|
| Begin Sync opcode | 1 | 0x8B | |
| Begin Sync length | 2 | 5 | |
| Begin Sync num-sections | 1 | 2 | |
| Begin Sync length | 2 | 0x0100 (Data Book) | |
| Begin Sync length | 2 | 0x0101 (Address Book) | |
| Return Status opcode | 1 | 0x00 | |
| Return Status length | 2 | 5 | |
| Return Status value | 1 | 0x00 (Success) | |
| Return Status operation | 1 | 0x8B (Begin Sync) | |
| Return Status num-sections | 1 | 1 | |
| Return Status section-id | 2 | 0x0100 (Date Book) | |
| Begin Section opcode | 1 | 0x86 | 0x06 |
| Begin Section length | 2 | 20 | 19 |
| Begin Section num-records | 2 | 3 | 3 |
| Begin Section num-modes | 1 | 2 | 1 |
| Begin Section mode | 1 | 0x00 (Fast Sync) | 0x00 |
| Begin Section last sync time | 15 | "19971230T083000" | "19971230T083000" |
| Begin Section mode | 1 | 0x02 (Slow Sync) | |
| Return Status opcode | 1 | 0x00 | |
| Return Status length | 2 | 2 | |
| Return Status value | 1 | 0x 00 (Success) | |
| Return Status operation | 1 | 0x86 (Begin Section) | |

*FIG. 7A*

| Message Element | Bytes | Connected Synchronization Sample Data | Connectionless Synchronization Sample Data |
|---|---|---|---|
| Add opcode | 1 | 0x81 | 0x01 |
| Add data length | 2 | 58 | 58 |
| Add temp-record-id | 4 | 0x0F00D010 | 0x0F00D010 |
| Add field-count | 1 | 4 | 4 |
| Add Field 1 field-id | 1 | 0 (Unique ID field) | 0 (Unique ID field) |
| Add Field 1 field-length | 2 | 4 | 4 |
| Add Field 1 field-value | 4 | 0x00001234 | 0x00001234 |
| Add Field 2 field-id | 1 | 100 | 100 |
| Add Field 2 field-length | 2 | 10 | 10 |
| Add Field 2 field-value | 10 | "John Smith" | "John Smith" |
| Add Field 3 field-id | 1 | 101 | 101 |
| Add Field 3 field-length | 2 | 12 | 12 |
| Add Field 3 field-value | 12 | "408-555-4567" | "408-555-4567" |
| Add Field 4 field-id | 1 | 102 | 102 |
| Add Field 4 field-length | 2 | 15 | 15 |
| Add Field 4 field-value | 15 | "19980102T083000" | "19980102T083000" |
| Add opcode | 1 | 0x81 | 0x01 |
| Add data length | 2 | 58 | 58 |
| Add temp-record-id | 4 | 0x0F00D011 | 0x0F00D011 |
| Add field-count | 1 | 4 | 4 |
| Add Field 1 field-id | 1 | 0 (Unique ID field) | 0 (Unique ID field) |
| Add Field 1 field-length | 2 | 4 | 4 |
| Add Field 1 field-value | 4 | 0x00001235 | 0x00001235 |
| Add Field 2 field-id | 1 | 100 | 100 |
| Add Field 2 field-length | 2 | 10 | 10 |
| Add Field 2 field-value | 10 | "Mary Jones" | "Mary Jones" |
| Add Field 3 field-id | 1 | 101 | 101 |
| Add Field 3 field-length | 2 | 12 | 12 |
| Add Field 3 field-value | 12 | "408-555-9102" | "408-555-9102" |
| Add Field 4 field-id | 1 | 102 | 102 |
| Add Field 4 field-length | 2 | 15 | 15 |
| Add Field 4 field-value | 15 | "19980103T093000" | "19980103T093000" |
| Delete opcode | 1 | 0x82 | 0x82 |
| Delete Data length | 2 | 5 | 5 |
| Delete unique-id length | 1 | 4 | 4 |
| Delete unique-id | 4 | 0x00010234 | 0x00010234 |
| End Section opcode | 1 | 0x07 | 0x07 |
| End Section length | 2 | 15 | 0 |
| End Section last sync time | 5 | 19980105T013000" | |

FIG. 7B

| Message Element | Bytes | Connected Synchronization Sample Data | Connectionless Synchronization Sample Data |
|---|---|---|---|
| Return Status opcode | 1 | 0x00 | |
| Return Status length | 2 | 6 | |
| Return Status value | 1 | 0x00 (Success) | |
| Return Status operation | 1 | 0x81 (Add) | |
| Return Status temp-record-id | 4 | 0x0F00D0010 | |
| Return Status opcode | 1 | 0x00 | |
| Return Status length | 2 | 6 | |
| Return Status value | 1 | 0x 00 (Success) | |
| Return Status operation | 1 | 0x81 (Add) | |
| Return Status temp-record-id | 4 | 0x0F00D0011 | |
| Return Status opcode | 1 | 0x00 | |
| Return Status length | 2 | 7 | |
| Return Status value | 1 | 0x00 (Success) | |
| Return Status operation | 1 | 0x82 (Delete) | 0 x 82 (Delete) |
| Return Status unique-id length | 1 | 4 | 4 |
| Return Status unique-id | 4 | 0x00010234 | 0x00010234 |
| Begin Section opcode | 1 | 0x06 | 0x06 |
| Begin Section length | 2 | 2 | 2 |
| Begin Section num-records | 2 | 2 | 2 |
| Modify opcode | 1 | 0x84 | 0x04 |
| Modify data length | 2 | 19 | 19 |
| Modify unique-id length | 1 | 4 | 4 |
| Modify unique-id | 4 | 0x00012334 | 0x00012334 |
| Modify field-count | 1 | 1 | 1 |
| Modify Field 1 field-id | 1 | 101 | 101 |
| Modify Field 1 field-length | 2 | 12 | 12 |
| Modify Field 1 field-value | 12 | "408-555-1435" | "408-555-1435" |
| Add opcode | 1 | 0x81 | 0x81 |
| Add data length | 2 | 52 | 52 |
| Add temp-record-id | 4 | 0xoF00D013 | 0xoF00D013 |
| Add field count | 1 | 3 | 3 |
| Add File 1 field-id | 1 | 100 | 100 |
| Add Field 1 field-length | 2 | 11 | 11 |
| Add Field 1 field-value | 11 | "Terry Adams" | "Terry Adams" |
| Add Field 2 field-id | 1 | 101 | 101 |
| Add Field 2 field-length | 2 | 12 | 12 |
| Add Field 2 field-value | 12 | "203-555-3345 | "203-555-3345 |
| Add Field 3 field-id | 1 | 102 | 102 |
| Add Field 3 field-length | 2 | 15 | 15 |
| Add Field 3 field-value | 15 | "199801041T141500" | "199801041T141500" |
| End Section opcode | 1 | 0x87 | 0x08 |
| End Section length | 2 | 0 | 15 |

*FIG. 7C*

| Message Element | Bytes | Connected Synchronization Sample Data | Connectionless Synchronization Sample Data |
|---|---|---|---|
| Return Status opcode | 1 | 0x00 | |
| Return Status length | 2 | 7 | |
| Return Status value | 1 | 0x00 (Success) | |
| Return Status operation | 1 | 0x84 (Modify) | |
| Return Status unique-id | 1 | 4 | |
| Return Status unique-id | 4 | 0x00012334 | |
| Return Status opcode | 1 | 0x00 | 0x00 |
| Return Status length | 2 | 11 | 11 |
| Return Status value | 1 | 0x00 (Success) | 0x00 (Success) |
| Return Status operation | 1 | 0x81 (Add) | 0x81 (Add) |
| Return Status temp-record- | 4 | 0x0F00D013 | 0x0F00D013 |
| Return Status unique-id | 1 | 4 | 4 |
| Return Status unique-id | 4 | 0x00010256 | 0x00010256 |
| Return Status opcode | 1 | 0x00 | |
| Return Status length | 2 | 2 | |
| Return Status value | 1 | 0x00 (Success) | |
| Return Status operation | 1 | 0x87 (End Section) | |
| | | | |
| End Sync opcode | 1 | 0x0C | |
| End Sync length | 2 | 0 | |

FIG. 7D

NOTIFICATION PROTOCOL FOR ESTABLISHING SYNCHRONIZATION MODE FOR USE IN SYNCHRONIZING DATABASES

BACKGROUND OF THE INVENTION

The invention relates to synchronizing and updating records in databases.

Often, data and information maintained on a number of remote database systems must be transferred to and consolidated on a central database. Since the data and information stored in the various databases change, e.g., through addition and deletion of data, the central database and the remote database systems have to be "synchronized." Synchronization is defined as a process by which two disparate application databases exchange data so that their contents become substantially identical.

Typically, during synchronization, changes in the remote database and the central database are transferred between the remote database and the central database. For example, after the central database is updated, the central database sends to the remote database a confirmation of the changes made. During the same message exchange, the central database may also transmit to the remote database changes in the central database that are of interest to the remote database.

The remote and central devices performing the synchronization of the databases are typically "connected." Connected devices have a predetermined turnaround latency. In other words, once a device sends a request for synchronization to another device, the connection will time out if the other device does not acknowledge the synchronization request from the first device within the predetermined latency time period. Examples for connected environments are the Starfish™ multi-point synchronization protocols and the active synchronization protocol from Microsoft® that operates in a Windows CE™ environment.

Before the databases can be synchronized, a synchronization mode is negotiated. Four different synchronization modes are typically available: (1) Fast Sync mode (both sides agree to send only additions, modifications, and deletions that occurred in the respective databases since the last synchronization was exchanged); (2) Semi-fast Sync mode (both sides agree to send to a database only additions and modifications, but not deletions; the responder is responsible for determining deletions that occurred since the last synchronization based on differences in the list of records); (3) Slow Sync mode (all records are exchanged; synchronization is performed based on unique record IDs and contains a full history file of previous synchronizations; a comparison of the full records themselves is not required; even applications capable of supporting Fast Sync may need to perform Slow Sync synchronization in certain cases); and (4) Full Re-Sync mode (all records are compared based on the full record contents, rather than on the history file as in "Slow Sync" mode and exchanged, except for records excluded by a filter; filters exclude, e.g., records that exceed a certain size).

Database updates have four important features: (1) consistency (a database is transformed or updated from one consistent state to another consistent state); (2) isolation (a transaction remains invisible to a user until successfully executed); (3) durability (the update survives even if this system subsequently crashes), and, more importantly, (4) atomicity (all changes are made or no changes are made at all). With atomicity, a successful execution of the last change request ensures that all requested changes were executed successfully.

SUMMARY OF THE INVENTION

The invention is directed to reducing message traffic during synchronization between a first database residing on a first computer (e.g., a remote computer or initiator) and a second database residing on a second computer (e.g., a central computer or responder). Unlike conventional synchronization that operates in a connected environment, the invention is capable of synchronizing the databases essentially independently of any latency in the communication channel.

In general, the first computer transmits to the second computer a proposed synchronization mode and at least one operation operative on a record stored in the second database. The second computer returns to the first computer a confirmation message accepting the proposed synchronization mode. The operation is transmitted to the second computer before the second computer returns to the first computer the confirmation message accepting the proposed synchronization mode.

Embodiments of the invention may include one or more of the following features. The first computer may transmit the proposed synchronization mode and the operations as a single message. The operations alone or in combination with the proposed synchronization mode may be concatenated into a single message. Each of the operations can be associated with one or more records stored in the first and second databases. The operations may control, e.g., the addition, deletion, archiving and modification of records in the first and second databases. Each of the records may have a unique record identifier.

The first computer and the second computer may communicate via a message layer having a latency; synchronization between the first and the second databases occurs independently of the latency of the message layer. The second computer may return to the first computer a confirmation message confirming a successful execution of the synchronization. The confirmation message may be returned at a later time, e.g., when the second computer receives a subsequent synchronization request from the first computer. The second computer may only have to confirm a successful execution of the last received operation since a confirmation of the last received operation is indicative of the successful execution of all operations received by the second computer. The confirmation message may also include one or more operations to be executed on the first computer.

The second computer may propose to the first computer a different synchronization mode if the initially proposed synchronization mode transmitted by the first computer is unacceptable to the second computer.

The first and second computers may each include one or more brokers that manage the respective databases. The respective brokers of one computer may be capable of interpreting and executing the proposed synchronization mode and the operations received from the respective other computer.

Further features and advantages of the present invention will be apparent from the following description of preferred embodiments and from the claims.

BRIEF DESCRIPTION OF THE DRAWINGS

FIG. 6 shows message elements and sample data exchanged in a notification; and

FIGS. 7A–7D show message elements and sample data exchanged during the processes of FIGS. 2 and 5.

DESCRIPTION OF THE PREFERRED EMBODIMENTS

The invention is embodied in a new lightweight protocol, referred to as Notification Transport Protocol (NotifyXP) 10. The NotifyXP protocol requires relatively little network traffic and is useful for communicating notification messages between an initiator 14 and applications running on a responder 16. NotifyXP also defines some procedural frameworks that allow the notification messages 18, 20 to be used for data synchronization. NotifyXP is particularly efficient in connectionless operation.

Figure 1:
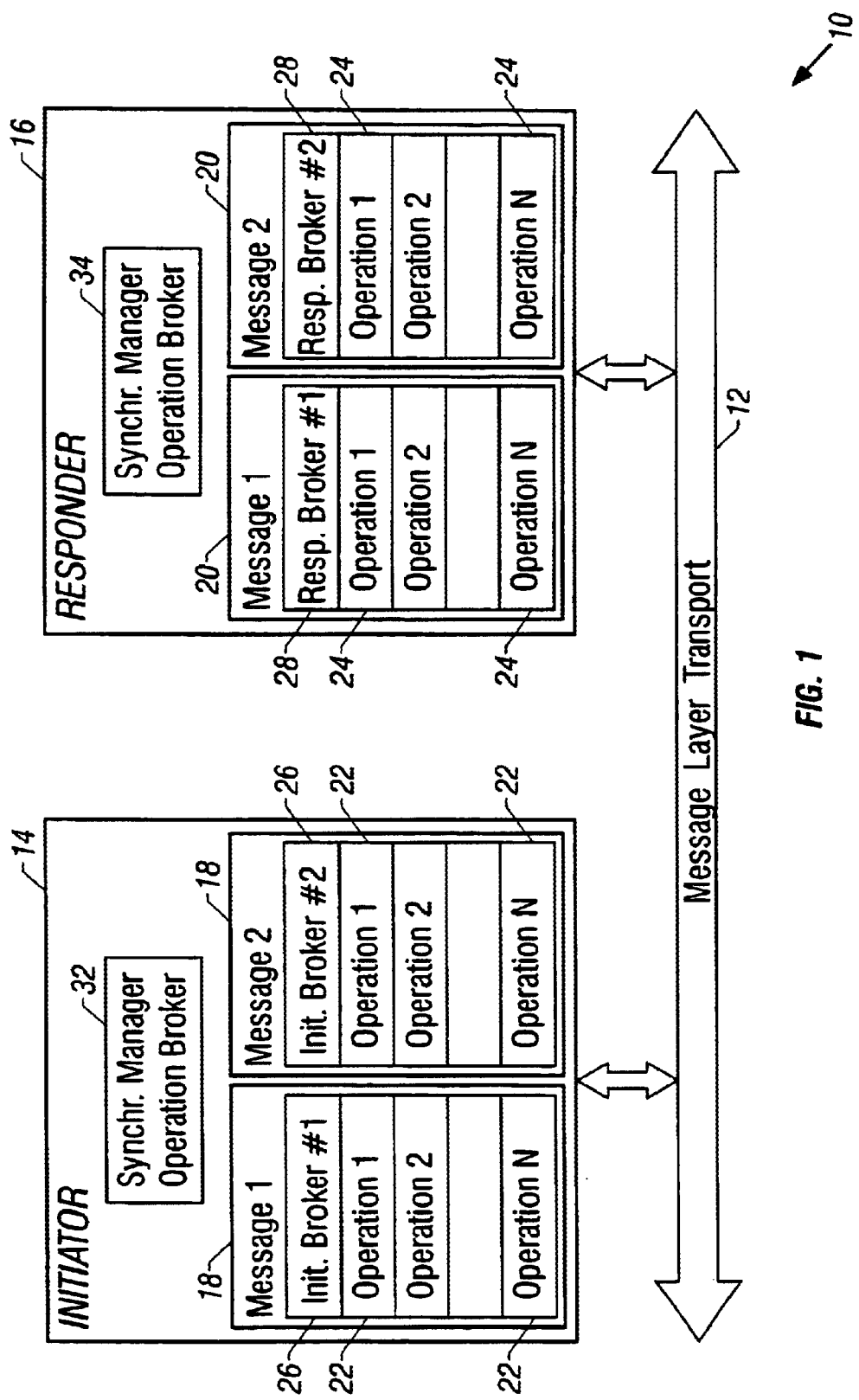
FIG. 1 shows synchronization between an initiator and a responder.

Referring now to FIG. 1, NotifyXP depends on a messaging layer transport 12 which is not part of the invention. NotifyXP assumes that the messaging layer transport 12 guarantees:

1. Message segmentation and re-assembly as required by any packet size limitations of the underlying media. This includes a guarantee that a message 18, 20 is delivered in its entirety or not at all, also referred to as "atomization". 2. Message routing to a specified responder on the target device or Network Server. 3. Any necessary authentication, encryption and/or compression to provide a secure and efficient transfer of NotifyXP message contents. NotifyXP does not perform the actual encryption, compression or data integrity check of the message contents.

If the message layer support that is built into the initiator 14 cannot support this functionality, the implementer of the NotifyXP application may have to provide an extra layer between the NotifyXP software and the internal messaging transport to extend its capabilities. Some message transport layers 12 cannot be extended to provide the level of support required by NotifyXP. For example, a one-way wireless-paging network with a small packet size may not be able to support the segmentation and re-assembly requirement. A initiator 14 and a responder 16 can be connected to more than one message transport layer 12 (not shown) to exchange data using NotifyXP. Moreover, a number of message transport layers can be combined to provide the NotifyXP required level of support.

NotifyXP can primarily be used to communicate messages 18, 20 containing operations 22, 24, respectively, between the initiator 14 and the responder 16, as illustrated in FIG. 1. The initiator 14 is responsible for packaging and sending the operations 22 on the message transport layer 12. The server or responder 16 is responsible for receiving the operations 24 from the message transport layer 12 and processing them.

Each message is associated with a "broker" 26, 28 that interprets and manages a certain set of operations 24 at the initiator 14 and responder site 16, respectively. A broker can be responsible for more than one operation. Different brokers 28 may interpret different operations differently. For example, the initiator Broker #1 26 handling an application "Schedule" interprets an "Add" operation (e.g., Operation 2 of Message 1) as a command to add a "Schedule" item to the "Schedule" database of the responder 16. Broker #2 handling an application "Alert" may interpret the same Operation 2 as a command to display a message to a user or to sound a beep on a speaker to alert the user to an upcoming meeting.

The operations 22 illustrated in FIG. 1 can be concatenated. Responder addressing is the responsibility of the messaging layer 12. Only one responder 16 can be defined in a single NotifyXP message 18. Additional details of these operations are listed in the Appendix. Operations within a message are arranged and interpreted in order. The responder Brokers 28 are responsible for handling NotifyXP operations 24 at the responder 16. NotifyXP uses the Operation Brokers 26, 28 for both synchronization and for processing application data.

The Brokers 26, 28 are also responsible for defining the formats of the application data to be processed, if these data are to be stored. The databases store the application data in the form of records. Each record must have an identifier that must be unique for that record within the application database and for the lifetime of the database. The identifier contains data that is specific to the type of data stored within a database. The identifier is understood by both the initiator and responder brokers that operate on the record. In certain NotifyXP operations, the record unique identifier (also called a unique ID) is represented as a reserved field with an identifier of zero (0). Each record also has one or more fields in which the contents of the record are stored. Each database will define whatever fields are required to represent the record data. With the exception of the reserved "Unique ID" zero field identifier, these definitions are opaque to NotifyXP.

NotifyXP Notifications occur between two brokers 26 and 28. For the purposes of a single notification, the broker 26 is defined to be the initiator and the other broker 28 is defined to be the responder. The procedure for notification is as follows:

1. The initiator (client) 14 offers data to the responder (server) 16.

2. There is an optional responder's response (if required for unique ID assignment or error reporting).

Advantageously, the responder's response does not have to happen immediately, i.e., there can be considerable latency. The responder's response also does not have to be transmitted via the same underlying message layer transport. Certain operations, however, require responses. For example, an Add operation of a record to a initiator requires a response mapping of the temporary record identifier to the application database unique identifier for the record. Even though the Add operation information is communicated using a notification procedure, the unique identifier is required by the synchronization procedure. As long as the identifier is present before the next synchronization begins, the synchronization procedure can use this data. This means the data can be logged/queued and prepended to the next synchronization message that is sent. A second example is error reporting which can be logged/queued or sent immediately depending upon cost of routing and/or severity of the error.

Since the databases in question may have very different capabilities for storage (e.g., a first device vs. a server running GroupWare applications), the broker for either database can specify preferences or limitations on the data stored. Since the cost of routing data to these applications can be expensive (particularly wireless network access of first devices), these preferences are preferably enforced at the initiator. These preferences are often enforced as filters (i.e., no records above a certain size).

NotifyXP Synchronization occurs between two operation brokers 26 and 28, with a NotifyXP reserved Operation Broker involved to control the synchronization procedure in some cases (see below). For the purposes of any one synchronization operation, e.g., for Notification, one broker is defined to be the initiator and the other is defined to be the responder.

The different modes for synchronization were described above: Fast Sync mode, Semi-fast Sync mode, Slow Sync mode and Full Re-Sync mode. NotifyXP supports all these synchronization modes. The synchronization mode that two applications will use, depends upon the properties of the applications. Note that application in this context means the application and any other broker(s) which have access to the application database.

Synchronization can occur by two different methods, Connected Synchronization and Connectionless Synchronization.

Connected Synchronization assumes that the messaging layer that NotifyXP uses to transfer its data is fundamentally connected and that initiators can expect a short latency for a response from responders.

A connected link allows the protocol to carry more traffic than a link that was trying to conserve the number of messages sent and received. A connected link is assumed to have less turnaround latency, but requires a higher bandwidth. Connected Synchronization requires the presence of Operation Brokers 32, 34 referred to as "Synchronization Manager Operation Broker" on the responder 16 and the initiator 14. The Synchronization Manager Operation Broker arbitrates responder resources that are responsible for handling the synchronization procedure and handles only two operations: "Begin Sync" and "End Sync". "Begin Sync" and "End Sync" bracket the individual section synchronization procedures, with the "End Sync" indicating the end of anticipated latencies in the connected synchronization procedure.

The Synchronization Manager Operation Broker can also arbitrate the synchronization process by returning an ordered list of sections that the device should use to offer its synchronization data in response to a "Begin Sync" operation. This is an optimization to allow the device section data to arrive at the responder in the order expected by the Synchronization Manager. If there is no list, the sections can be sent in any order. Additional details of the Return Status operation are listed in the Appendix.

Figure 2:
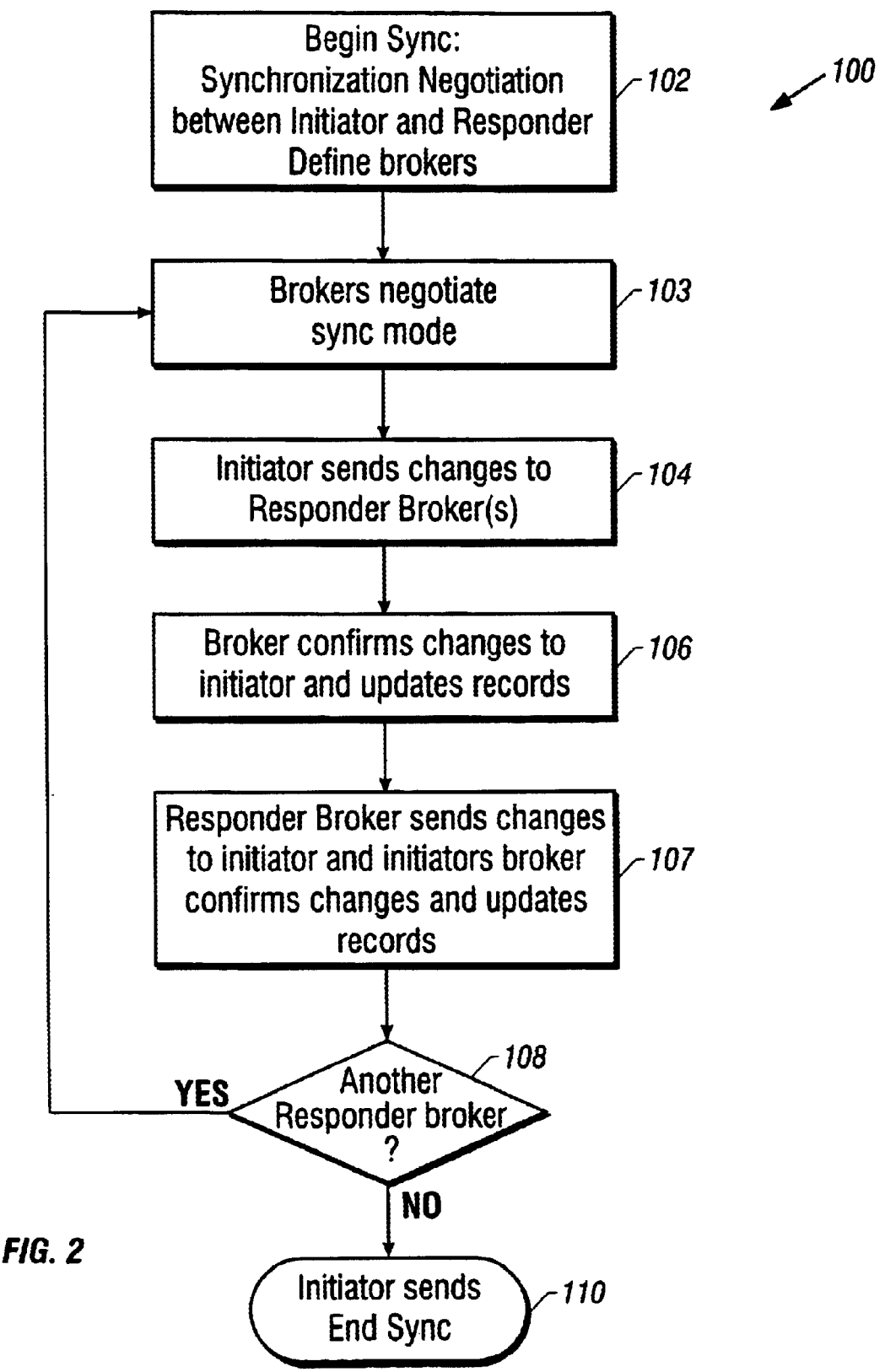
FIG. 2 is a flow diagram of synchronization in a connected environment.

Referring now to FIG. 2, in the procedure 100 for Connected Synchronization, the initiator Synchronization Manager Broker 32 initiates synchronization negotiations with the responder Synchronization Manager Broker 34 by sending to the responder Synchronization Manager Broker 34 a request for synchronization. The responder responds to this request, for example, by defining an ordered list of brokers for the synchronization, step 102. A so identified initiator broker 26 in the negotiated ordered list sends a request to negotiate a specific synchronization mode, and the responder broker 28 identified in the negotiated ordered list responds to this request, step 103. If the responder fails to supply a list of brokers in step 102, the initiator selects the next broker 26 in step 103. After the negotiation of the synchronization mode is successfully completed, initiator broker 26 sends changes in the initiator's database consistent with the negotiated synchronization mode to the responder broker 28, step 104. Responder broker 28 confirms the changes, step 106. Responder broker 28 sends changes in the responder's database consistent with the negotiated synchronization mode to initiator broker 26 and the initiator broker 26 confirms these changes, step 107. If the ordered list of brokers negotiated in step 102 contains other brokers, the procedure 100 returns to step 103.

Otherwise, the procedure 100 terminates when the initiator Synchronization Manager Broker 32 sends an End Sync command to the responder Synchronization Manager Broker 34, step 109.

Figure 3:
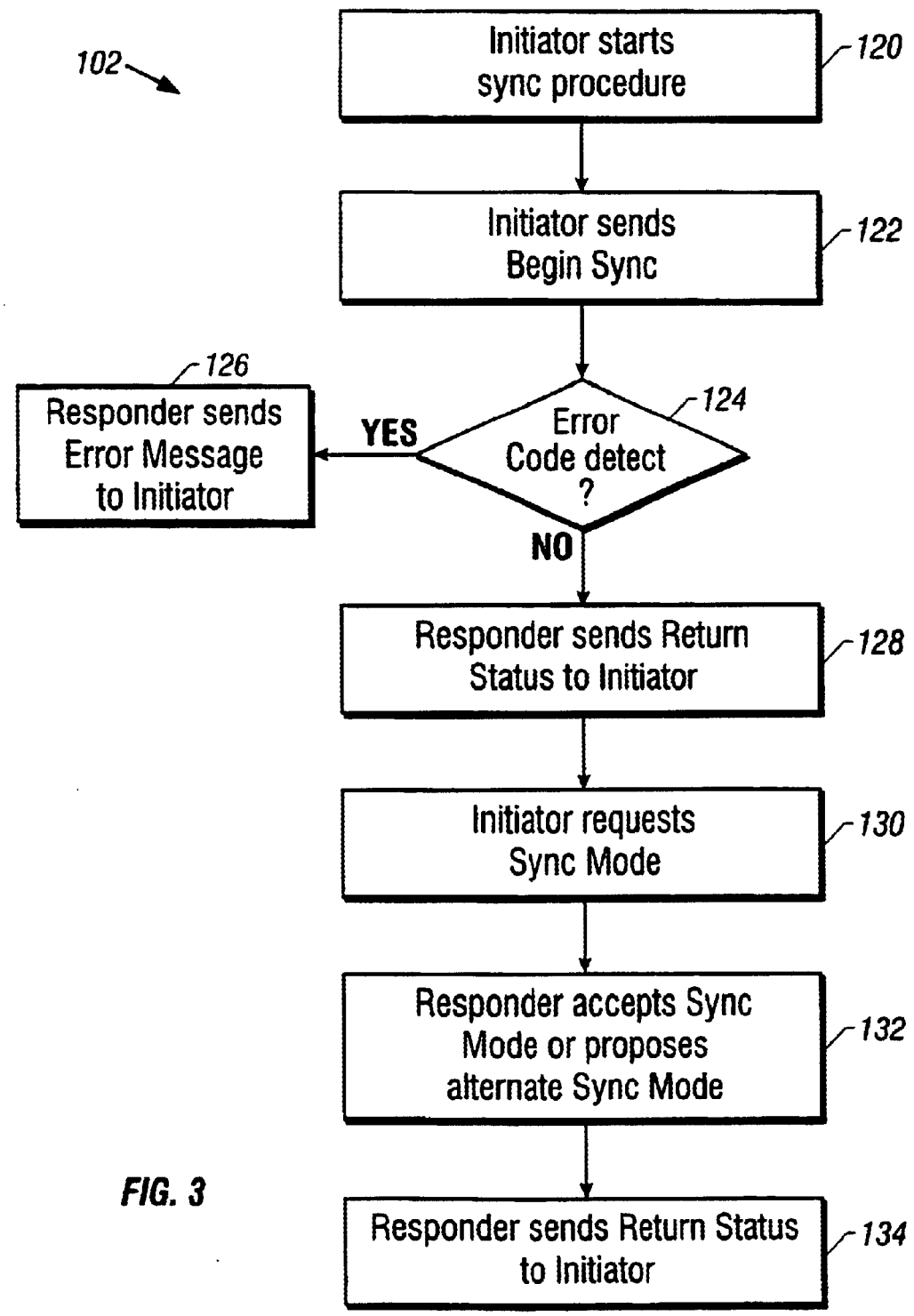
FIGS. 3 and 4 show details of the flow diagram of FIG. 2.

Details of the negotiation of the synchronization protocol are illustrated in FIG. 3. The initiator Synchronization Manager Broker 32 starts the synchronization procedure for one or more operation brokers, step 120, by sending a "Begin Sync" operation to the Synchronization Manager Operation Broker 34, step 122. The "Begin Sync" operation proposes a list of sections to be synchronized.

The responder checks if an error code was detected, step 124, and sends either an error message, step 126, or a "Return Status" operation to the initiator, step 128. If no error code was detected, the "Return Status" operation allows the procedure to continue with a list of sections to be synchronized. The following steps are implemented for each pair of operation brokers that must synchronize their data.

Figure 4:
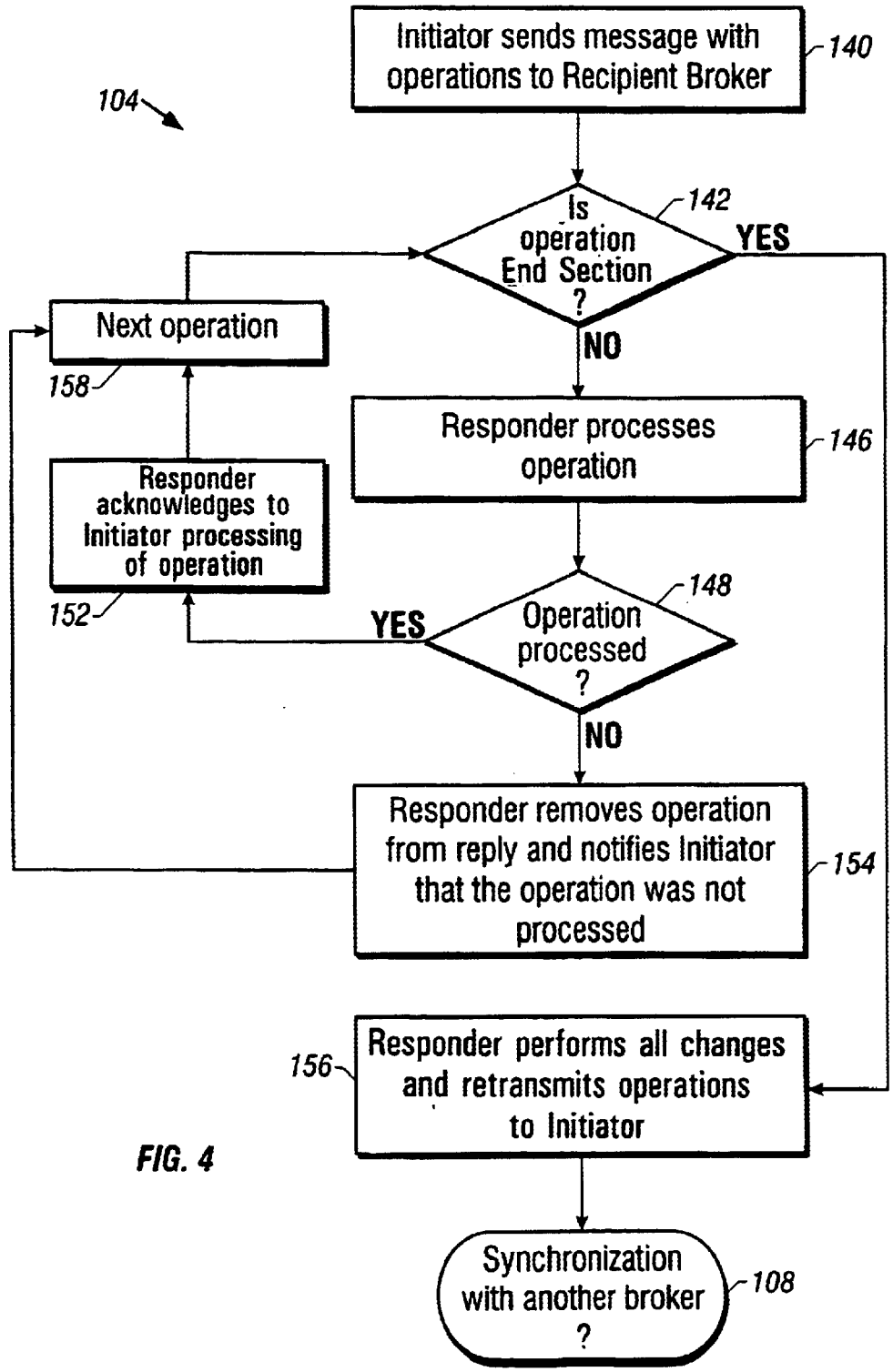

The initiator requests synchronization from the responder broker by sending a "Begin Section" operation which specifies the requested synchronization mode(s) to be used, step 130, explicitly requests a "Return Status" operation in response. The responder can accept the requested synchronization mode or specify a mutually acceptable mode in the extra data associated with the "Return Status" operation, step 132. The responder then sends the appropriate "Return Status" operation to the Referring now to FIG. 4, after receiving the "Return Status" operation in step 134 of FIG. 3, the initiator 14 sends all changes to the responder broker 28 of the local single operation 22, 24 and all operations explicitly request a response from the responder broker, as discussed below. These operations can be concatenated in single message for efficiency.

The responder 16 then processes each operation, step 146, and after processing, step 148, sends an acknowledgment to the initiator 14 that the operation has been successfully processed, step 152. The initiator then transmits the next operation, step 158, or transmits an "End Section" operation. If the operation was not successfully processed, then the responder removes the operation from the reply and notifies the initiator that the operation was not processed, step 154. Note that transmission of these acknowledgements by the responder indicates that the operation was successfully processed and not merely received. The responder can wait until it has received the "End Section" operation from the initiator to send the requested "Return Status" operations to reduce the number of messages sent.

Once the initiator has transmitted all of the changes, it transmits an "End Section" operation, step 142. This is the way the responder broker is informed that the synchronization changes have been completely transmitted. The responder then computes the changes on its own local database, step 156 and retransmits the operations to the initiator to inform the initiator responder of the changes. The responder retransmits the operations following the same steps as the initiator. The responder, of course, does not have to negotiate the synchronization mode when it offers its data and can therefore use a form of the "Begin Section" operation which does not specify a requested synchronization mode.

Returning now to FIG. 2, the synchronization steps 104 and 106 are performed for all Operation Brokers required by the initiator. The initiator then sends an "End Sync" operation to the Synchronization Manager Operation Broker to indicate that synchronization has been completed.

Synchronization can be negotiated for the mode to be used with each database section/ broker. In addition, each broker can supply a list of possible modes to use during synchronization in order of preference. This allows the responder broker to use some intelligence to propose a different sync mode if the first preference for a synchronization mode is not available on the responder. Further details about the "Begin Section" operation are provided in the Appendix.

The responder controls the details for synchronizing the database. An initiator may propose some sections in a "Begin Sync" operation that are not supported on the responder. The responder then removes these operations from the list sent as a reply. Conversely, the responder may not return any database sections in its reply that are not present in the initiator's "Begin Sync" operation.

The second approach is called Connectionless Synchronization and makes no assumption (or has no knowledge about) the turnaround latency of the messaging layer. The goal is to minimize the number of messages exchanged. This approach can also be used on a "connected" messaging layer. Since turnaround latency is not an issue for connectionless synchronization, no Synchronization Manager Operation Brokers are required.

Figure 5:
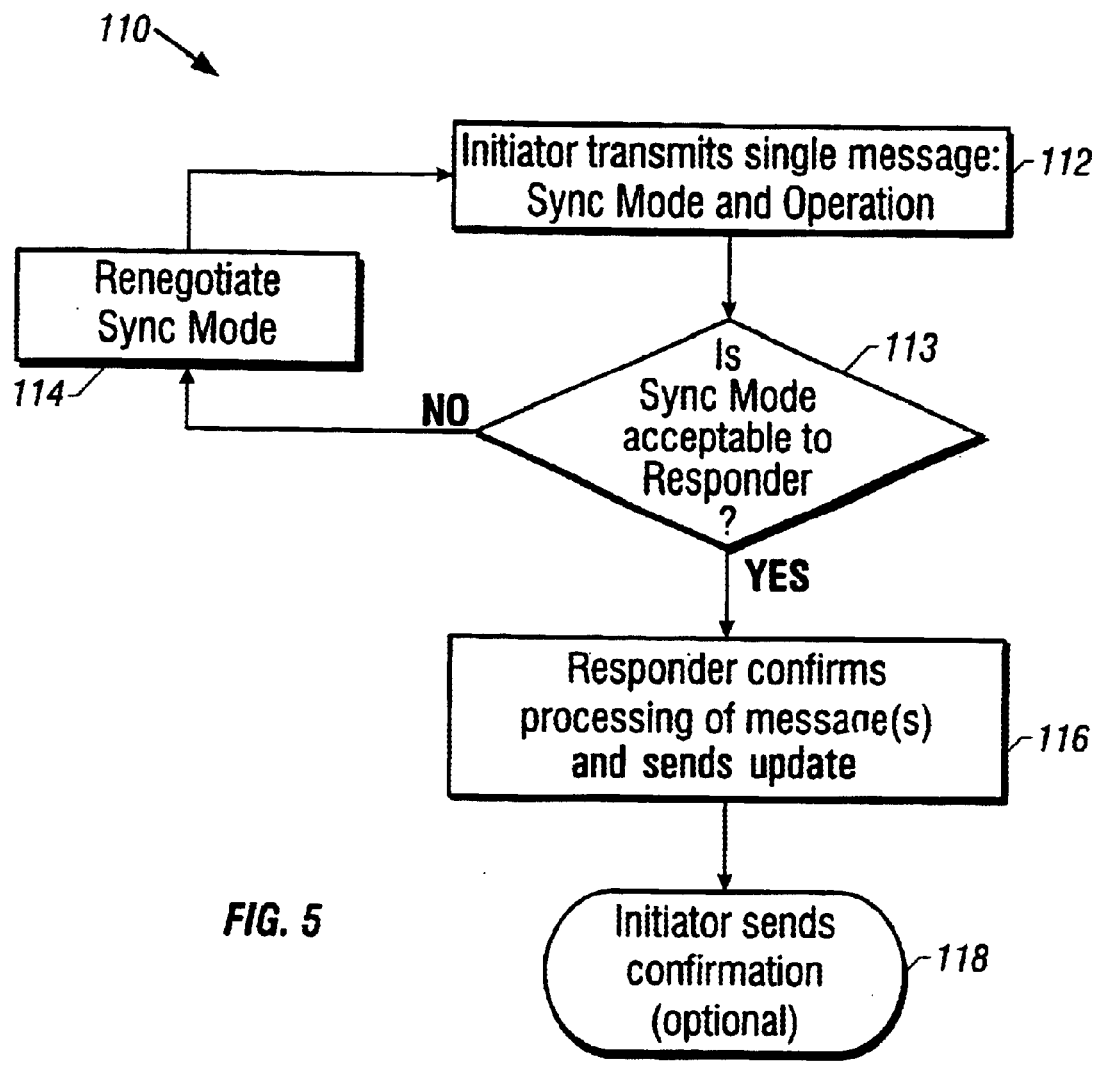
FIG. 5 is a flow diagram of synchronization in a connectionless environment.

Referring now to FIG. 5, in the procedure for Connectionless Synchronization 110, the initiator transmits a single message which contains both the proposed synchronization mode and the operation to be performed, step 112. In step 112, the initiator requests synchronization from the responder broker by sending a "Begin Section" operation which includes all of the following: the requested synchronization mode to be used, the operations specifying all of the changes appropriate for the requested synchronization mode, and an "End Section" operation to indicate the end of the offered data. These operations are sent as a single concatenated message. Note that not every individual operation has to be confirmed separately since the message layer guarantees that a message will be delivered in its entirety or not delivered at all.

Once the responder has received the "End Section" operation from the initiator and accepts the synchronization mode, step 113, the responder begins building its response message to the initiator, but transmits the message only after the information to be transmitted in the message is complete. The first operations contained in the message of the responder are the "Return Status" operations to the initiator's offered operations. The responder then adds a "Begin Section" operation to the outgoing message. Since in the present example the responder accepted the requested synchronization mode, the responder's "Begin Section" operation does not have to specify a synchronization mode. The responder appends all changes to the message that were executed by the responder, including a request for a response from the initiator for the last operation. Finally, the "End Section" operation is added to the end of the message and the message is sent to the initiator, step 116. Once the initiator has received the "End Section" operation from the responder, the initiator may respond by acknowledging that the responder's offered data have been processed. The initiator may send this response either immediately after receiving the message from the responder or, alternatively, with the next synchronization of the database. Sending the confirmation with the next synchronization request advantageously reduces message traffic on the message transport layer.

If the responder, however, does not accept the synchronization mode proposed by the initiator, step 113, then the responder must renegotiate the synchronization mode by specifying the desired synchronization mode, step 114. The initiator must prepare supplemental operations to offer back to the responder. The operations required to satisfy the responder's newly requested synchronization mode can omit those operations that were already sent in the initial initiator operation offer. The initiator brackets all these operations with "Begin Section" and "End Section" operations and sends the message.

Under the most favorable conditions, Connectionless Synchronization requires only two (2) NotifyXP messages. This is the case if none of the initiator's operations require a response from the responder and if the responder does not have to transmit any operations to the initiator, except to indicate the end of the synchronization procedure. These are short messages.

As mentioned above, the initiator does not have to acknowledge receipt of the responder's operation until the next required contact with the responder, which can be a subsequent synchronization procedure or a notification procedure.

In the worst case, a maximum of four (4) NotifyXP messages are required when the responder redefines the synchronization mode.

The following discussion will explain the structure of the NotifyXP protocol in more detail. Although NotifyXP is defined to function as a connectionless protocol, its client and server are stateful. As described above, each NotifyXP message includes one or more NotifyXP operations. Each operation that is sent by the NotifyXP client, changes either the state of the NotifyXP server or the state of the application data to which the NotifyXP server interfaces. NotifyXP operations consist of a byte opcode followed by two bytes of the length of optional additional data in network byte order followed by any optional additional data. These aspects of NotifyXP are discussed in greater detail in the Appendix.

As also discussed above, NotifyXP operations may or may not require a response from the operation responder. NotifyXP operations that require a response have the most significant bit of the opcode byte set. It is possible to request that a single operation be performed with or without an expected response operation. If an operation fails, a NotifyXP broker must return a non-successful status for an operation regardless of whether a response was explicitly requested. NotifyXP servers do not have to return status for operations that were performed successfully unless a response is explicitly requested.

NotifyXP clients can use this feature to ensure successful positive acknowledgement of operations while minimizing message traffic. For example, a NotifyXP initiator sends a series of operations. The initiator needs to know about the success of each and every operation, but only the last operation sent in a message requires an explicit response, because the messaging layer guarantees complete delivery of messages. The responder is also required by NotifyXP to process operations in order of receipt and must return error status even if a status return is not explicitly requested. Therefore, the absence of a "Return Status" operation with an error before the final "Return Status" operation indicates that all operations up to the final operation were processed successfully.

Referring now to FIG. 6, a NotifyXP message notifies a responder broker of a request to add of a new record and to delete an existing record. The "Date Book" broker processes these requests.

This message requests a response to the "Add" operation. The first line of data specifies an "Add" operation, the second line the lengths of the operation including the data to be added and the third line a temporary record ID. Line four specifies that a total of three fields will be added (Field 1: the name; Field 2: the telephone number; and Field 3: the date and time of the appointment), lines 5–13. As discussed in the Appendix, the server will return a unique ID (line 16) after each successful "Add" operation to allow record ID mapping. Depending upon the device rules for cost of routing, available messaging layer transports, etc., the device can respond immediately or queue the response until the next time the response can be transmitted. The responder may, but is not required to, return a "Return Status" operation with a unique ID to indicate success if the device supports Unique ID assignment.

Referring now to FIG. 7A to 7D and also to FIGS. 2 and 5, Connected Synchronization is compared with Connectionless Synchronization for a single section. The initiator operations are in boldface and the responder operations are in italic. Blank lines are used for readability but do not imply message boundaries. For example, the most efficient message coding of the Connected Synchronization contains four (4) initiator messages to the responder (FIG. 7A with 2 messages and FIGS. 7B and 7D with 1 message each) and three (3) responder messages to the initiator (FIG. 7A with 2 messages and FIG. 7C with 1 message). The Connectionless Synchronization reduces the minimal number of required messages for synchronization to one (1) initiator messages to the responder (1 message concatenated from the operations of FIGS. 7A and 7B, respectively) and one (1) responder message to the initiator (FIG. 7C).

As seen in FIG. 7A, the synchronization procedure in the connected mode begins with a request from the device to the Synchronization Manager operation broker to begin synchronization. The request specifies two sections: Date Book and Address Book. In the selected example, the responder only supports synchronization to the Date Book. Therefore, the request is accepted with the "Return Status" operation that indicates that the only section to be synchronized is the Date Book. Note that the identifier for this section is provided for example only—it is the responsibility of the Synchronization Manager brokers on the initiator and responder to agree on values for the section identifiers.

This section is absent in the connectionless mode.

In both modes, the procedure continues with a request from the device to synchronize all changes to the records for the responder broker since Dec. 30$^{th}$, 1997 at 8:30 am using Fast Sync.

In the connected mode, the initiator also explicitly advertises Slow Sync as a fallback option. The responder broker acknowledges the request with a "Return Status" operation. The response indicates that the Fast Sync mode requested can be used since no other mode was suggested.

This section is absent in the connectionless mode.

Referring now to FIG. 7B, the device then offers in both modes the full range of proposed changes to the responder broker. The proposed changes in the present example are identical. In this case, there are two appointment additions ("John Smith" and "Mary Jones"), which include the respective names, telephone numbers and the date and time of the appointment. Also requested is one deletion. The device then sends an "End Section" operation to signal that it has transmitted the last of its data and that the responder should process the data it received and return its own data back to the device.

Referring now to FIG. 7C, in the connected mode, the responder processes the offered device data and generates "Return Status" operations. Then the responder performs synchronization on the new change data received from the device and on its own data that have changed since the last synchronization. The responder brackets the results of the synchronization with "Begin Section" and "End Section" operations. In this case, the changes resulting from the synchronization consist of one modification (a telephone number) and one addition (the entry "Terry Adams"). Note that the Modify operation does not send all fields, only those fields that have changed. The "End Section" operation contains the new "last sync time" that the device stores and uses in its next Fast-Sync procedure.

In the connectionless mode, only the last successful change (0x82; Delete) is transmitted from the responder to the initiator, since its successful execution indicates that all previous changes have also been successfully executed. The responder also transmits, like in the connected mode, the changes in its own database since the last synchronization.

Referring now to FIG. 7D, in the connected mode, the device then acknowledges receipt of the data from the responder, including receipt of the new "last sync time" from the responder Operation Broker. Finally, the device sends the End Section message to the responder to indicate that all sections have been synchronized.

In contrast, in the connectionless mode, the device confirms only that the update was successfully completed. This confirmation can be postponed until the next synchronization or notification, as mentioned above.

In other words, in the connectionless mode, when the initiator sends its operations, only the last operation in a message requires a response. This reduces the number of operations the responder must send to the device to properly acknowledge the device's operations. Only an error encountered by the responder broker on the responder while processing the operation would require a response from the device.

The connectionless Synchronization Procedure, unlike the connected Synchronization Procedure, does not enforce a fixed response time for each sent message. The time between messages can also vary over a wide range. However, unless the device and responder brokers have "agreed" upon a delayed delivery of responses to outstanding messages and operations, synchronization times should be kept as short as possible.

It is to be understood that the embodiments and variations shown and described above are illustrative of the principles of this invention only and that various modifications may be implemented by those skilled in the art without departing from the scope and spirit of the invention.

APPENDIX

1. NotifyXP operations
The supported NotifyXP operations are described in the table below.

| Operation Name | Operation ID | Description | Response? |
|---|---|---|---|
| Return Status | 0x00 | Return status for a previous operation | No |
| Add | 0x01 | Add/Create a record | Only for Status |
| Delete | 0x02 | Delete a record | Only for Status |
| Delete and Modify | 0x03 | Delete a record after | Only for Status |
| | 0x04 | Modify an existing record | Only for Status |
| Unmodified Records | 0x05 | Declare list of unmodified records | No |

APPENDIX-continued

1. NotifyXP operations
The supported NotifyXP operations are described in the table below.

| Operation Name | Operation ID | Description | Response? |
|---|---|---|---|
| Begin Section | 0x06 | Tag beginning of sync offer data stream/ request sync mode | Only for Status |
| End Section | 0x07 | Tag end of sync data stream | Only for Status |
| Cancel Procedure | 0x08 | Cancel a currently pending procedure | Only for Status |
| Request Properties | 0x89 | Request operational properties | Advertise or Status |
| Advertise Properties | 0x0A | Advertise operational properties | No |
| Begin Sync | 0x0B | Tag beginning of sync procedure | Only for Status |
| End Sync | 0x0C | Tag end of sync procedure | Only for Status |
| Reserved | 0x0D–0x2F | Reserved for future use | No |
| User Defined | 0x30–0x3F | Range for user defined extensions | No |
| Reserved | 0x40–0x7F | Reserved for future use | No |

Each operation is encoded as a single byte and may have additional data bytes associated with it. The following sections provide a description of each operation including any additional data that the operation specifies. Each section also provides a definition of the operation structure using modified Backus-Naur Notation (BNF). The BNF definitions use the following terms that are defined for use by any operation.

| | | |
|---|---|---|
| The unique-id | = | id-length id-data |
| id-length | = | BYTE |
| id-data | = | binary |
| temp-record-id | = | DWORD |
| field-count | = | BYTE (value zero is reserved B see below) |
| op-data-length | = | (depends on value of Operation Size Property) |
| record-field | = | field-id field-length field-value |
| field-id | = | BYTE |
| field-length | = | (same size as op-data-length) |
| field-value | = | binary \| boolean \| date-time \| text \| rrule \| exdate |
| binary | = | BYTE *[BYTE] |
| boolean | = | "0" \| "1" |
| date-time | = | ISO 8601 time and date ASCII representation |
| text | = | <ASCII or Unicode characters> |
| rrule | = | <vCalendar Recurrence Rule> |
| exdate | = | <vCalendar Exception Dates/Times> |
| BYTE | = | <any 8-bit value> |
| WORD | = | <2-byte unsigned number in network byte order> |
| DWORD | = | <4-byte unsigned number in network byte order> |

The sizes of the op-data-length and field-length terms are defined by the Operation Size Property. Details are provided in section "Advertise Properties" in this Appendix. The formats of the rule and exdate properties are consistent with those defined in the vCalendar™ specification, The Electronic Calendaring and Scheduling Exchange Format, Version 1.0. vCalendar™ is a trademark of Apple Computer, Inc., AT&T Corp., International Business Machines Corp., and Siemens.

Additional information regarding the format of these rules can be found in the sections 2.1.11 (Basic Recurrence Rule Grammar (e.g., "W1 TU TH")) and 2.3.12 Exception Date/Times (e.g., "19960402; 19960403")) of the vCalendar™ specifications version 1.0.

There is one field-id which is reserved for use by NotifyXP. This is the "Unique ID" field (field-id ==0). This field can be used to communicate a record's unique identifier as one of its fields. This convention is used by the "Add" and "Modify" operations. For this reason, the zero field-id value is reserved and should not be used for any other field identifier.

2. Return Status The "Return Status" operation is used to inform the responder about the status of a previous operation. The "Return Status" operation is defined below using BNF.

| | | |
|---|---|---|
| rs-operation | = | rs-command op-data-length status-header |
| rs-command | = | BYTE (0x00) |
| status-header | = | operation-status operation-id [operation-data] |
| operation-status | = | BYTE (see below) |
| operation-id | = | BYTE |
| operation-data | = | (see below) |

The following table shows the supported values for the operation-status term.

| Status | Value | Meaning |
|---|---|---|
| Success | 0x00 | OK - Success |
| Bad Operation | 0x01 | Operation contains malformed syntax |
| Unauthorized Operation | 0x02 | Operation needs authentication |
| Conflict | 0x03 | Database may be locked |
| Unsupported Operation | 0x04 | Operation Not Supported |
| Unknown Target | 0x05 | Operation specified unknown target |
| Operation Refused | 0x06 | Operation was refused by user |
| Responder Busy | 0x07 | Operation could not be processed, responder was busy |

The following table shows the method for interpreting the operation-id and corresponding operation-data term.

| Operation-ID | Operation-data | Description |
|---|---|---|
| Add | Temp-record-id [Unique-id] | Temporary and optional Unique record ID of Add |
| Delete | Unique-id | Unique record ID of Delete |
| Delete and Archive | Unique-id | Unique record ID of Delete and Archive |
| Modify | Unique-id | Unique record ID of Modify |
| Unmodified Records | None | None |
| Begin Section | Sync Mode (BYTE) | Highest supported level of synchronization |
| End Section | None | None |
| Cancel Procedure | None | None |
| Request Properties | None | None |
| Advertise Properties | None | None |
| Begin Sync | Section-list | Ordered List of enabled sections to synchronize |
| End Sync | None | None |

The operation data for an Add operation is the temporary record identifier followed by the optional Unique ID for the added record. Some brokers do not support the assignment of temporary record identifiers to Unique IDs (e.g., brokers on an responder might not need to return a unique ID for a record which was added for their initiator client). Other brokers may want to indicate that an error occurred on the Add operation that resulted in a failure to assign a Unique ID. These brokers do not have to include the optional Unique ID when responding to the Add operation. Like any optional final term in a NotifyXP operation, the Unique ID can be omitted by excluding it from the operation data using the correct value for op-data-length.

The Operation data for the "Begin Sync" opcode can specify an optional ordered list of enabled sections as its operation data. The order in which the section identifiers appear in the list is the order in which the responder expects to receive the section data. The format of the list is described below using BNF.

| | | |
|---|---|---|
| operation-data | = | section-list |
| section-list | = | num-sections *section-id |
| num-sections | = | BYTE |
| section-id | = | WORD |

The section-id term must be defined between the Synchronization Manager operation broker on the initiator and the Enterprise Server. NotifyXP does not specify an identifier for database sections. "Begin Section" only returns a different sync mode from what was requested if the responder broker is unable to process the requested sync mode. See the section "Begin Section" for an interpretation of the value of the Sync Mode BYTE.

3. Add

The "Add" operation is used to specify that a record to be added by the responder broker. The "Add" operation is defined below using BNF.

| | | |
|---|---|---|
| add-operation | = | add-command op-data-length add-header *[record-field] |
| add-command | = | BYTE (0x01) |
| add-header | = | temp-record-id field-count |

The temp-record-id is assigned by the NotifyXP client for the add request. A NotifyXP client will receive a successful "Return Status" operation with a unique ID back from the server for every successful "Add" operation to allow it to perform record ID mapping. Not all NotifyXP brokers support unique identifier assignment. For example, a broker that performed transient alerts on the data would not need to assign an ID to the data since it would never be stored on the device.

There is one other requirement for the Add operation. If the responder broker requires the record's unique ID, this can be sent using the reserved "Unique ID" field (field-id== 0). This is commonly the case when a initiator communicates a record addition to a responder (e.g., during synchronization). Generally, the responder does not send unique IDs for the new records it adds to the initiator client because of storage constraints and because the initiator rarely cares about a unique ID for a record in a database section other than its own. The decision is left up to the implementer.

4. Delete

The "Delete" operation is used to specify a record to be deleted by the responder broker. The "Delete" operation is defined below using BNF.

| | | |
|---|---|---|
| del-operation | = | del-command op-data-length unique-id |
| del-command | = | BYTE (0x02) |

5. Delete and Archive

The "Delete and Archive" operation is used to specify a record to be archived and deleted by the responder broker. The "Delete and Archive" operation is defined below using BNF.

| | | |
|---|---|---|
| da-operation | = | da-command op-data-length unique-id |
| da-command | = | BYTE (0x03) |

Before deletion, the record should be archived if the application database supports archiving. If the database does not support archiving a status for the record must be returned indicating what actions were performed on the database.

6. Modify

The "Modify" operation is used to update the contents of a specified record with the responder broker. The "Modify" operation is defined below using BNF.

| | | |
|---|---|---|
| mod-operation | = | mod-command op-data-length field-count * [record-field] |
| mod-command | = | BYTE (0x04) |

There is one restriction on records used in the Modify operation. The record must contain a value for the reserved "Unique ID" field (field-id ==0). This is to allow the responder broker to know which record is being modified.

7. Unmodified Records

The "Unmodified Records" operation is used to indicate that the specified record list has not been modified since the last synchronization in the application database that is managed by the responder broker. The "Unmodified Records" operation is defined below using BNF.

| | | |
|---|---|---|
| ur-operation | = | ur-command op-data-length num-records *unique-id |
| ur-command | = | BYTE (0x05) |
| num-records | = | DWORD |

The num-records term defines how many unique-id terms follow.

8. Begin Section

The operation "Begin Section" is used in both types of synchronization procedures to tag the beginning of an operation stream that will be part of a synchronization procedure and, optionally, to request what synchronization mode that procedure will use. The operation "Begin Section" is defined below using BNF.

| | | |
|---|---|---|
| beg-operation | = | beg-command op-data-length [sync-header] |
| beg-command | = | BYTE (0x06) |
| num-records | = | WORD |
| sync-header | = | num-records [sync-mode-list] |

-continued

| | | |
|---|---|---|
| sync-mode-list | = | num-modes *(sync-mode [mode-len mode-data]) |
| num-modes | = | BYTE |
| sync-mode | = | BYTE see below) |
| mode-len | = | BYTE |
| mode-data | = | (see below) |

The num-records term is a signed value indicating the number of records that will be sent as the synchronization data for the section. If the number of records is unknown, the value 0xFFFF (−1) can be sent.

As mentioned in the Synchronization Procedure section, a broker may specify that it can operate in more than one synchronization mode when negotiating a connected synchronization procedure. This is to allow the responder broker a greater deal of flexibility in deciding which type of synchronization to perform. The number of sync modes the initiator can support is contained in the num-modes term. (Note that in a connectionless procedure, only a single mode can be specified since the initiator offers all data before the responder can respond with its requested sync mode.) The following table shows the supported values for the sync-mode term and the method for interpreting the corresponding optional mode-data term.

| Sync-mode | Value | Optional Mode-data | Mode-data meaning |
|---|---|---|---|
| Fast Sync | 0x00 | Date-time term | Date and time of the last synchronization |
| Semi-fast Sync | 0x01 | Date-time term | Date and time of the last synchronization |
| Slow Sync | 0x02 | None | None |
| Full Re-Sync | 0x03 | None | None |

The date-time term is in ISO 8601 format.

In a connected synchronization procedure, the modes appear in the order of preference of the initiator. For example, assume an initiator that supported Fast Sync and used a time stamped change log to track changes to the database. The first sync mode in the list might be a Fast Sync with the last sync time to the current remote, the second would be a Fast sync with the time stamp of the oldest change in the change log, and the third mode would be Slow Sync. It is worthy of note in this case that the broker would be capable of handling a Fast Sync request for any date between the oldest change in the log and the last sync time inclusive although a Fast Sync with the last sync time is its first choice.

9. End Section The operation "End Section" is used to tag the end of a synchronization operation stream for the section. This operation indicates that the responder broker must apply all received operations for the current synchronization procedure and transition to the next step in the procedure.

The operation "End Section" is defined below using BNF.

| | | |
|---|---|---|
| es-operation | = | es-command op-data-length [sync-date] |
| es-command | = | BYTE (0x07) |
| sync-date | = | date-time |

The date-time term is the new synchronization date and time for the section in ISO 8601 format. This is sent only from the initiator to the responder and is usually the time on the initiator at which the corresponding "Begin Section" operation was sent. The initiator and responder will use this time as the "last sync time" for the next "Fast Sync" they perform on this section.

10. Cancel Procedure

The "Cancel Procedure" operation is used to request that the current procedure (e.g., synchronization) be terminated. The "Cancel Procedure" operation is defined below using BNF.

| | | |
|---|---|---|
| cp-operation | = | cp-command op-data-length |
| cp-command | = | BYTE (0x08) |

Note that op-data-length for this operation is always zero. If this operation succeeds, the current procedure is considered cancelled and both the transmitting and responder brokers are responsible for recovering their state.

11. Request Properties

The "Request Properties" operation is used to request the operational properties of the responder broker. The "Request Properties" operation is defined below using BNF.

| | | |
|---|---|---|
| rp-operation | = | rp-command op-data-length |
| rp-command | = | BYTE (0x89) |

The response to this operation is an "Advertise Properties" operation and is always required. Note that op-data-length for this operation is always zero.

12. Advertise Properties

The "Advertise Properties" operation is used to inform the responder about the operational properties of a broker. The "Advertise Properties" operation is defined below using BNF.

| | | |
|---|---|---|
| ap-operation | = | ap-command op-data-length num-properties * [property] |
| ap-command | = | BYTE (0x0A) |
| num-properties | = | BYTE |
| property | = | property-id property-length property-value |
| property-id | = | BYTE (see below) |
| property-length | = | WORD |
| property-value | = | (see below) |

The following table shows the supported values for the property-id term and the method for interpreting the corresponding property-value term. This table can be extended in the future. If a responder does not understand any property-id value, it may be skipped in property parsing.

| Property Name | Property-Id | Value | Description |
|---|---|---|---|
| Sync mode | 0x00 | BYTE | Highest level of sync support |
| Supported Operations | 0x01 | Array of BYTEs | Enumeration of supported operations |
| Version | 0x02 | 3 BYTEs | Supported version of NotifyXP |
| Operation Size | 0x03 | BYTE | Size of op-data-length and field-length |

The Sync Mode property describes the highest level of synchronization supported by the broker. The values for the BYTE are described in the "End Section" operation section. The Supported Operations property is an array of the operation byte codes the broker supports. The Version property is the version of NotifyXP that the broker supports. The three bytes are interpreted in the following manner: the first byte is the major version, the second byte is the minor version, and the third byte is the revision.

The Operation Size property is the size in bytes of the op-data-length and field-length terms used by the sender. The default value for this property is two (2) which means that by default, these two terms are WORDs. This default value is re-initialized with every new message. A NotifyXP initiator that wishes to override this default (e.g., it needs to send a record which contains a field which is longer than 65535 bytes) may do so in the following way. The initiator includes an Advertise Properties operation that specifies a new value for the Operation Size property in the message prior to any operations that require the larger size. The Operation Size value then remains as specified until either a subsequent Advertise Properties operation changes it again or it reverts back to default at the end of the message.

NotifyXP does not require that remote clients keep track of servers to which they connect. However, if a client does keep track of servers, it can cache the non-transient capabilities of each responder server. It is only necessary to advertise the properties of a NotifyXP client when:
1. Previously advertised properties have changed.
2. The remote specifically requests properties by issuing a "Request Properties" operation.
13. Begin Sync The "Begin Sync" operation is used to initiate a connected synchronization procedure. The "Begin Sync" operation is defined below using BNF.

| | | |
|---|---|---|
| begsync-operation | = | begsync-command op-data-length section-list |
| begsync-command | = | BYTE (0x0B) |
| section-list | = | num-sections *section-id |
| num-sections | = | BYTE |
| section-id | = | WORD |

The section-id term must be defined between the Synchronization Manager operation broker on the initiator and the Enterprise Server. NotifyXP does not specify an identifier for database sections.
14. End Sync The "End Sync" operation is used to signal the successful termination of a connected synchronization procedure. The "End Sync" operation is defined below using BNF.

| | | |
|---|---|---|
| endsync-operation | = | endsync-command op-data-length |
| endsync-command | = | BYTE (0x0C) |

What is claimed is:

1. A method for synchronizing a first database residing on a first computer with a second database residing on a second computer, wherein there are a plurality of synchronization modes specifying the procedure to be used for synchronizing the first and second databases, the method comprising:
the first computer making a choice of a proposed synchronization mode from among the plurality of synchronization modes, and transmitting to the second computer a notification of the proposed synchronization mode and at least one operation operative on a record stored in the second database; and
the second computer returning to the first computer a confirmation message accepting the proposed synchronization mode,
wherein the at least one operation is transmitted to the second computer before the second computer returns to the first computer the confirmation message accepting the proposed synchronization mode.

2. A computer program, residing on a computer-readable medium, for synchronizing a first database residing on a first computer with a second database residing on a second computer, wherein there are a plurality of synchronization modes specifying the procedure to be used for synchronizing the first and second databases, comprising instructions for causing:
the first computer to make a choice of a proposed synchronization mode from among the plurality of synchronization modes, and to transmit to the second computer a notification of the proposed synchronization mode and at least one operation operative on a record stored in the second database; and
the second computer to return to the first computer a confirmation message accepting the proposed synchronization mode,
wherein the at least one operation is transmitted to the second computer before the second computer returns to the first computer the confirmation message accepting the proposed synchronization mode.

3. The subject matter of claim 1 or 2, wherein the first computer transmits the proposed synchronization mode and the at least one operation as a single message.

4. The subject matter of claim 1 or 2, wherein the first computer and the second computer communicate via a message layer having a latency and wherein the first and the second databases are synchronized independently of the latency of the message layer.

5. The subject matter of claim 3, wherein a plurality of the operations are concatenated in the single message.

6. The subject matter of claim 1 or 2, wherein each of the operations is associated with at least one record in at least one of the first and second databases.

7. The subject matter of claim 1 or 2, wherein each of the records comprises a unique record identifier.

8. The subject matter of claim 1 or 2, wherein the second computer returns to the first computer a confirmation message confirming a successful execution of the synchronization.

9. The subject matter of claim 8, wherein the second computer returns the confirmation message to the first computer not before receiving a subsequent synchronization request from the first computer.

10. The subject matter of claim 8, wherein the second computer confirms a successful execution of only the last received operation and wherein the confirmation of the last received operation is indicative of the successful execution of all operations received by the second computer.

11. The subject matter of claim 1 or 2, wherein the operations comprise at least one of adding, deleting, archiving and modifying records in at least one of the first and second databases.

12. The subject matter of claim 1 or 2, wherein the confirmation message comprises at least one operation operative on a record stored in the first database.

13. The subject matter of claim 12, wherein the operations comprise at least one of adding, deleting, archiving or modifying records in at least one of the first and second databases.

14. The subject matter of claim 1 or 2, wherein the second computer proposes to the first computer a second synchronization mode if the first proposed synchronization mode transmitted by the first computer is unacceptable to the second computer.

15. The subject matter of claim 1 or 2, wherein the first computer is a mobile computer.

16. The subject matter of claim 1 or 2, wherein the second computer is a host computer.

17. The subject matter of claim 1 or 2, wherein the first computer comprises at least one first broker for managing the first database.

18. The subject matter of claim 1 or 2, wherein the second computer comprises at least one second broker for managing the second database.

19. The subject matter of claim 18, wherein the second broker is capable of interpreting and executing the proposed synchronization mode and the at least one operation received from the first computer.

\* \* \* \* \*

UNITED STATES PATENT AND TRADEMARK OFFICE
CERTIFICATE OF CORRECTION

PATENT NO. : 7,007,003 B1
APPLICATION NO. : 09/205020
DATED : February 28, 2006
INVENTOR(S) : Stephen G. Rybicki It is certified that error appears in the above-identified patent and that said Letters Patent is hereby corrected as shown below:

Cover page 2, U.S. PATENT DOCUMENTS, U.S. Patent No. 5,251,151, "Demjanemko et al." should be -- Demjanenko --.

Cover page 3, OTHER PUBLICATIONS, second column, Larson et al., "Engineerring" should be -- Engineering --.

Cover page 4, OTHER PUBLICATIONS, second column, Slater, "2Com" should be -- 3Com --.

Cover page 5, OTHER PUBLICATIONS, first column, Rubin, "Mac" should be -- Macs --.

Cover page 5, OTHER PUBLICATIONS, first column, "Logical Connectivity," after "Stuart Madnick &", insert -- Y. Richard Wang, MIT, Systems Sciences, 1991 Hawaii Int'l, vol. 1, IEEE (June 1991) --.

Cover page 5, OTHER PUBLICATIONS, second column, "User Manual for PC- Link", "19890" should be -- 1989 --.

Column 3, line 41, "A" should be -- An --.

Column 4, line 43, "a initiator" should be -- an initiator --.

Column 6, line 27, after "the", insert -- initiator, step 134. --

Column 6, line 31, after "local", insert -- application database, step 140. Each change represents a --.

Column 9, line 28, "messages" should be -- message --.

Column 9, line 46, "30$^{th,}$" should be -- 30$^{th}$, --.

Column 11, line 60, "rule" should be -- rrule --.

Column 13, line 2, "an responder" should be -- a responder --.

Column 13, line 33, after "record", insert -- is --.

UNITED STATES PATENT AND TRADEMARK OFFICE
CERTIFICATE OF CORRECTION

PATENT NO. : 7,007,003 B1
APPLICATION NO. : 09/205020
DATED : February 28, 2006
INVENTOR(S) : Stephen G. Rybicki It is certified that error appears in the above-identified patent and that said Letters Patent is hereby corrected as shown below:

Column 13, line 56, "a initiator" should be -- an initiator --.

Column 15, line 6, after "BYTE", insert -- ( --.

Signed and Sealed this

Twelfth Day of December, 2006

JON W. DUDAS
*Director of the United States Patent and Trademark Office*